(12) United States Patent
Kahng et al.

(10) Patent No.: US 9,922,161 B2
(45) Date of Patent: Mar. 20, 2018

(54) IC LAYOUT ADJUSTMENT METHOD AND TOOL FOR IMPROVING DIELECTRIC RELIABILITY AT INTERCONNECTS

(71) Applicant: The Regents of the University of California, Oakland, CA (US)

(72) Inventors: Andrew B. Kahng, Del Mar, CA (US); Tuck Boon Chan, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 14/767,458

(22) PCT Filed: Feb. 20, 2014

(86) PCT No.: PCT/US2014/017423
§ 371 (c)(1),
(2) Date: Aug. 12, 2015

(87) PCT Pub. No.: WO2014/133867
PCT Pub. Date: Sep. 4, 2014

(65) Prior Publication Data
US 2015/0379188 A1    Dec. 31, 2015

Related U.S. Application Data

(60) Provisional application No. 61/769,941, filed on Feb. 27, 2013.

(51) Int. Cl.
*G06F 17/50* (2006.01)

(52) U.S. Cl.
CPC ...... *G06F 17/5081* (2013.01); *G06F 2217/12* (2013.01); *Y02P 90/265* (2015.11)

(58) Field of Classification Search
CPC ............ G06F 17/5081; G06F 17/5072; G06F 2217/12
(Continued)

(56) References Cited

U.S. PATENT DOCUMENTS 6,446,250 B1 * 9/2002 Becker ................. G06F 17/505
716/122
6,859,916 B1   2/2005 Teig et al.
(Continued)

FOREIGN PATENT DOCUMENTS

WO    199855950 A1    12/1998

OTHER PUBLICATIONS

Bashir, Muhammad, et al., "Towards a Chip Level Reliability Simulator for Copper/Low-k Backend Processes", IEEE Design Automation and Test in Europe, (2010), pp. 279-282.
(Continued)

*Primary Examiner* — Phallaka Kik
(74) *Attorney, Agent, or Firm* — Greer, Burns & Crain, Ltd.; Steven P. Fallon

(57) ABSTRACT

Method for adjusting a layout used in making an integrated circuit includes one or more interconnects in the layout that are susceptible to dielectric breakdown are selected. One or more selected interconnects are adjusted to increase via to wire spacing with respect to at least one via and one wire of the one or more selected interconnects. Preferably, the selecting analyzes signal patterns of interconnects, and estimates the stress ratio based on state probability of routed signal nets in the layout. An annotated layout is provided that describes distances by which one or more via or wire segment edges are to be shifted. Adjustments can include thinning and shifting of wire segments, and rotation of vias.

31 Claims, 18 Drawing Sheets

(58) Field of Classification Search
USPC ......... 716/54, 56, 55, 52, 53, 112, 122, 129, 716/130, 132, 136
See application file for complete search history.

(56) References Cited

U.S. PATENT DOCUMENTS

| | | | |
|---|---|---|---|
| 7,269,813 B2* | 9/2007 | Brown | H01L 23/49827 257/773 |
| 7,373,625 B2* | 5/2008 | Stine | G05B 15/02 716/56 |
| 7,380,231 B2 | 5/2008 | Zhang et al. | |
| 7,401,310 B1* | 7/2008 | Thaden | G06F 17/5045 716/112 |
| 7,698,676 B1* | 4/2010 | Qian | G06F 17/5077 716/119 |
| 7,793,238 B1* | 9/2010 | Rabkin | G06F 17/5081 703/1 |
| 7,913,221 B2* | 3/2011 | Miyashita | G06F 17/5031 716/126 |
| 7,930,667 B2 | 4/2011 | Bergman Reuter et al. | |
| 8,612,919 B2* | 12/2013 | Pikus | G06F 17/5081 716/102 |
| 2001/0018757 A1* | 8/2001 | Morikawa | G06F 17/5068 716/52 |
| 2004/0064796 A1 | 4/2004 | Li | |
| 2005/0079654 A1 | 4/2005 | Gabara et al. | |
| 2006/0101355 A1* | 5/2006 | Ciplickas | G06F 17/5045 716/51 |
| 2006/0136861 A1* | 6/2006 | Lucas | G06F 17/5068 716/53 |
| 2006/0195809 A1* | 8/2006 | Cohn | G06F 17/5068 716/53 |
| 2006/0225012 A1 | 10/2006 | Deura | |
| 2008/0046852 A1 | 2/2008 | Bergman Reuter et al. | |
| 2009/0193378 A1 | 7/2009 | Adkisson et al. | |
| 2009/0200683 A1 | 8/2009 | Colburn et al. | |
| 2009/0249266 A1 | 10/2009 | Pierrat et al. | |
| 2009/0291512 A1* | 11/2009 | Izuha | G06T 7/0004 438/16 |
| 2009/0319960 A1 | 12/2009 | Lin | |
| 2010/0333052 A1* | 12/2010 | Tsuchiya | G03F 7/70633 716/106 |
| 2011/0108838 A1* | 5/2011 | Kageyama | B06B 1/0292 257/49 |
| 2012/0038056 A1 | 2/2012 | Cabral, Jr. et al. | |
| 2013/0086541 A1* | 4/2013 | Luo | G06F 17/5081 716/112 |
| 2014/0312399 A1* | 10/2014 | Kuroda | H01L 27/092 257/288 |

OTHER PUBLICATIONS

Chan, Tuck Boon, et al., "Post-Routing Back-End-of-Line Layout Optimization for Improved Time-Dependent Dielectric Breakdown Reliability", Proc. SPIE 8684, Design for Manufacturability through Design-Process Integration VII, 86840L (Mar. 29, 2013), 11 pages.

* cited by examiner

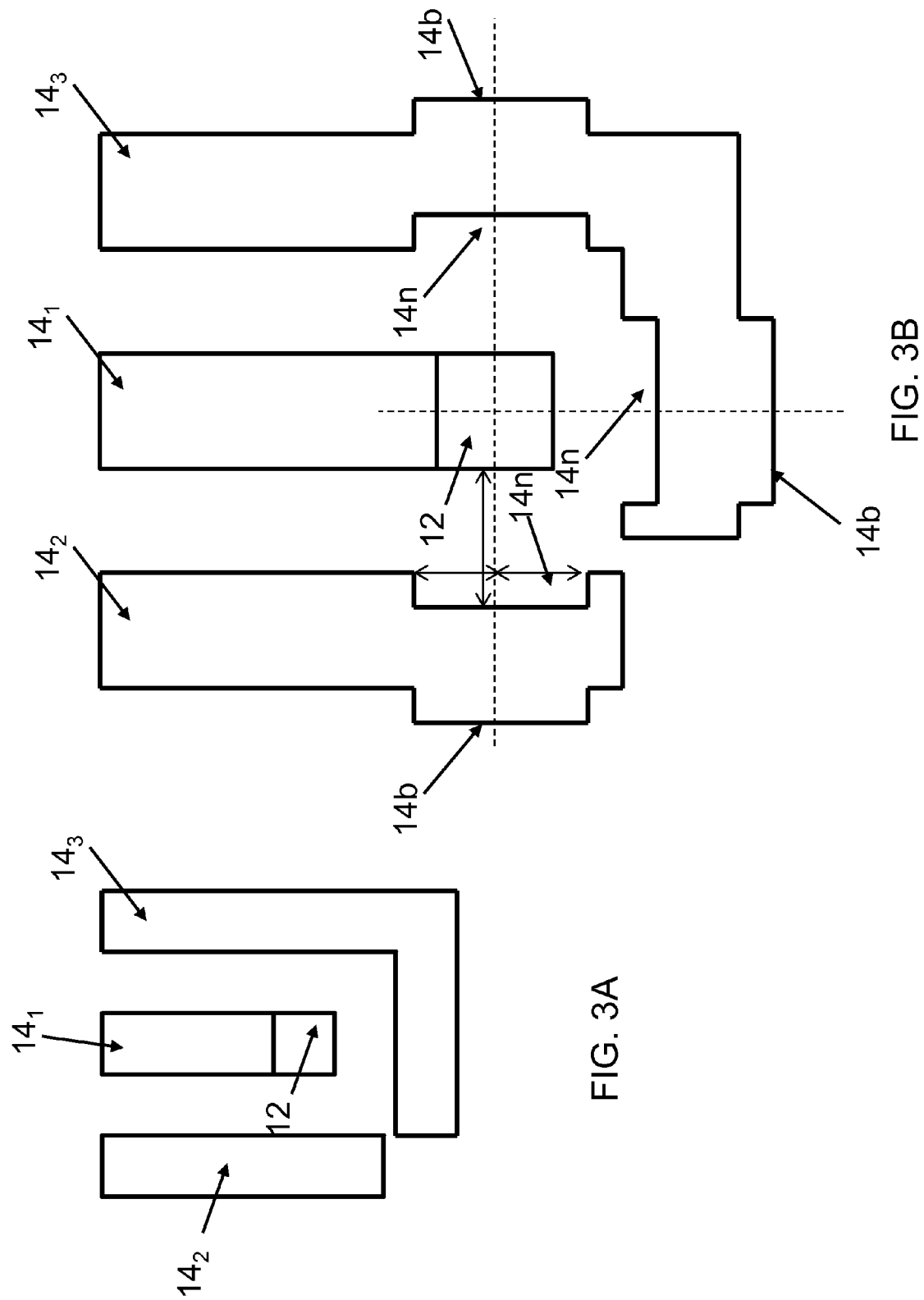

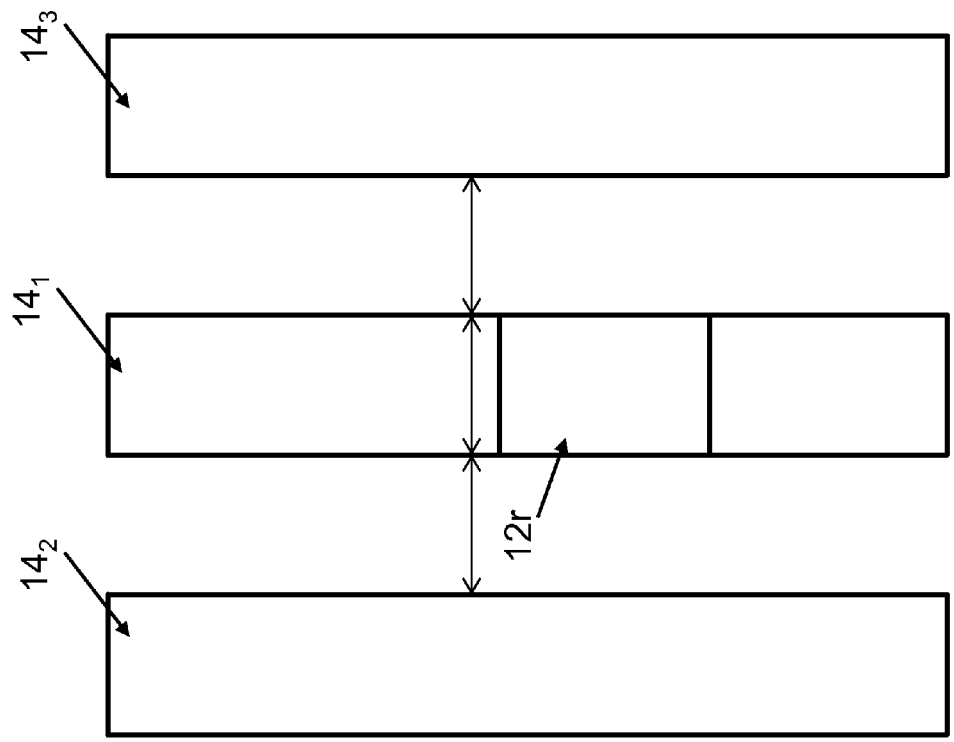
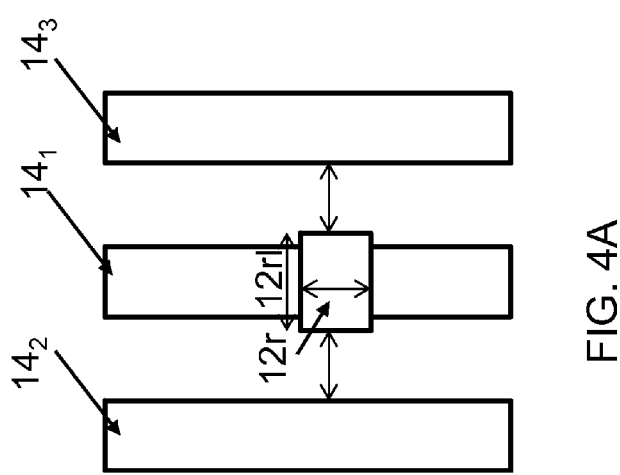

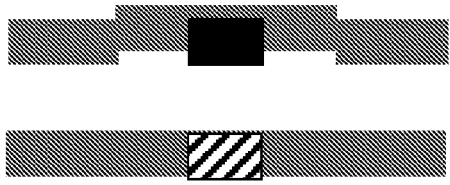
FIG. 5B
FIG. 5C
▨ Via located above a wire
■ Via located below a wire
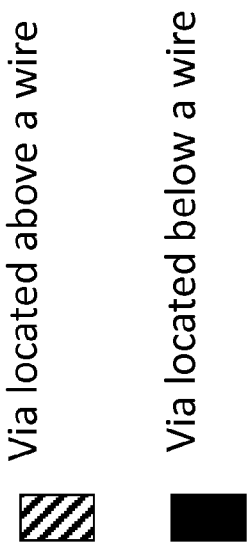
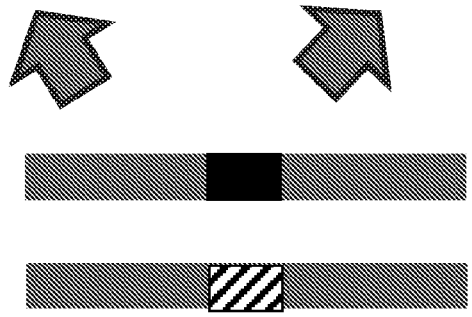
FIG. 5A

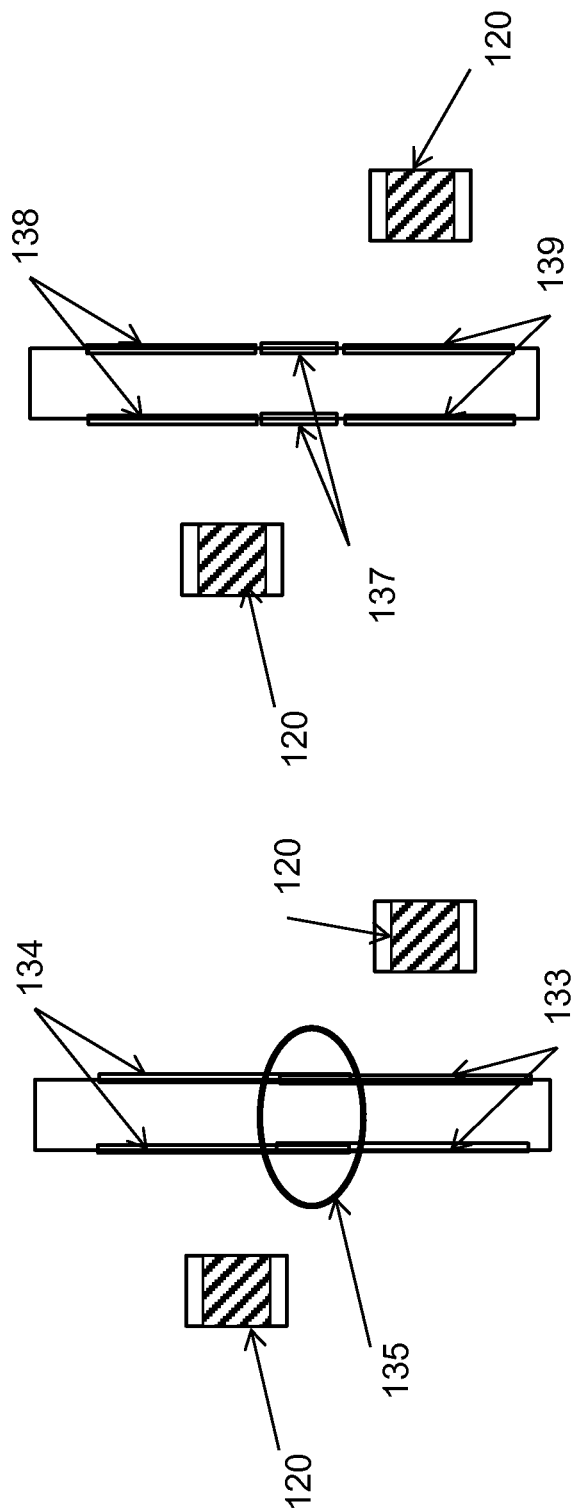

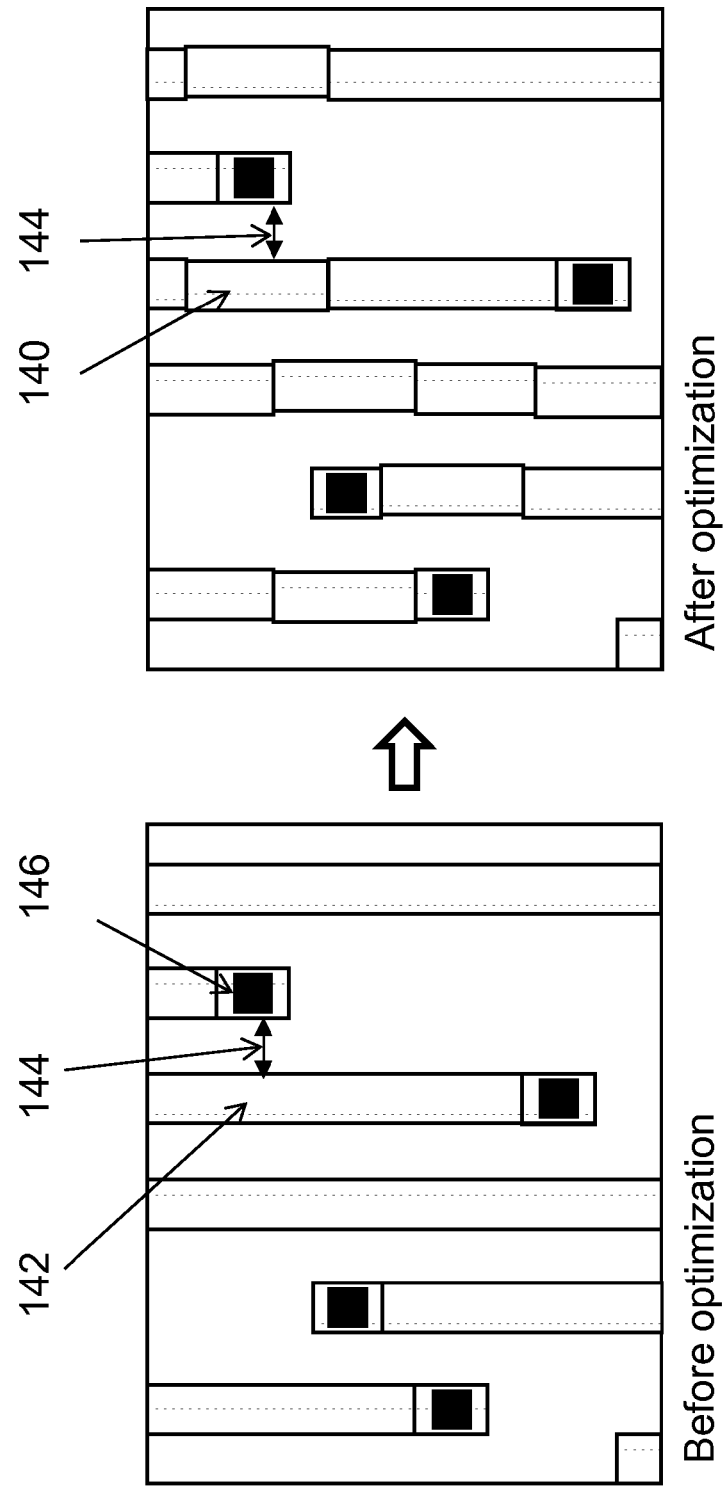

IC LAYOUT ADJUSTMENT METHOD AND TOOL FOR IMPROVING DIELECTRIC RELIABILITY AT INTERCONNECTS

PRIORITY CLAIM AND REFERENCE TO RELATED APPLICATION

The application claims priority under 35 U.S.C. § 119 and applicable treaties from prior provisional application Ser. No. 61/769,941, which was filed on Feb. 27, 2013.

The invention was made with government support under 1187086 (DE-AC04-94AL8500) awarded by the Department of Energy. The Government has certain rights in the invention.

FIELD

Fields of the invention include integrated circuits and integrated circuit fabrication, and particularly integrated-circuit (IC) layout and manufacturing process adjustment. Interconnect patterning can be adjusted via the invention for dielectric reliability. A particular application of the invention is to back-end-of-line design for interconnects between layers in integrated circuit layouts having very small feature sizes.

BACKGROUND

Lithography is an optical patterning process that patterns a material, e.g., photoresist, which is then developed to define a mask for integrated circuit fabrication processes. Reducing feature sizes to be smaller than the wavelength of light used to form the pattern in photoresist is referred to as sub-wavelength lithography. Sub-wavelength lithography presents many challenges to manufacturers trying to maintain the economic scaling of semiconductors postulated by Moore's Law. Double patterning lithography techniques are sub-wavelength techniques that are used to achieve sub 45 nm nodes with presently available manufacturing equipment. A standard single photoresist pattern begins to blur at about 45 nm feature size. With double patterning lithography methods, coarse patterns can be used to define patterns that exceed the resolution limit of the optical lithography tool used to pattern the material being patterned and developed as a mask.

Very narrow process windows are provided for the interconnect formation in back-end-of-line processing as feature sizes get smaller. The spacing between a signal line in a particular metallization layer and the adjacent line can be smaller than the width of the lines themselves. A via from another metallization layer must land on the intended wire in the layer below. The limits of modern lithography techniques and inherent variation in processing capabilities often create misalignments between vias and wires. The misalignments vary from the intended layout. The double patterning technique, for example, processes odd numbered and even numbered signal lines in separate steps. While this permits reducing node size, it increases the risk of via misalignment during manufacture.

The reliability of modern integrated circuits is dependent upon the reliability of the signals transmitted using such layer interconnections, i.e., vias and wires. The interconnections are isolated by insulating dielectric material, which degrades over IC lifetime when there is an electric field across the dielectric. An undesirable conducting path forms between interconnects adjacent interconnects when dielectric breakdown occurs. Such time-dependent dielectric breakdown (time-dependent dielectric breakdown) creates short circuits between interconnects. Dielectric mean time to failure is the expected time for the dielectric to form a conductive path between interconnects. The mean time to failure is inversely proportional to the strength of electrical field across the dielectric, and therefore reduces when voltage difference between interconnects increases or when the spacing between interconnects reduces.

Photomask misalignment between via and wire has been recognized as a cause of smaller via-to-wire spacing, and degraded time-dependent dielectric breakdown reliability. S.-C. Lee, et al., "Limitation of Low-k Reliability due to Dielectric Breakdown at Vias" *IEEE International Interconnect Technology Conference*, pp. 177-79 (2008); M. Stucchi and Z. Tőkei, "Impact of LER and Misaligned Vias on the Electric Field in Nanometer-Scale Wires," *IEEE International Interconnect Technology Conference*, 174-176 (2008). The smaller via-to-wire spacings increase the electric field across dielectric, which accelerates dielectric breakdown.

Others have shown that time-dependent dielectric breakdown is dominated by via-to-wire spacing rather than wire-to-wire spacing. Xia et al., "Characterization and Challenge of time-dependent dielectric breakdown Reliability in Cu/Low K Dielectric Interconnect," *IEEE International Reliability Physics Symposium*, pp. 2C.1.1-2C.1.4 (2011). This report also showed that dielectric mean time to failure increases when the minimum spacing between interconnects (via-to-wire spacing) increases. Past efforts to improve interconnect dielectric reliability have focused on improving fabrication techniques.

Cabral et al. US Published Application No. US 20120038056 discloses an interconnect structure for improving time dependent dielectric breakdown. Techniques are disclosed to form trapezoid shaped interconnect vias. The base width of the vias are greater than the upper surfaces. By increasing the distance between the upper surfaces of adjacent interconnect structures, an increased amount of dielectric material is present between the interconnects, and this is intended to increase the reliability of time-dependent dielectric breakdown.

Colburn et al. US Published Application 20090200683 discloses method for forming interconnect structures described to produce partially self-aligned vias. The process elongates via patterns in a direction orthogonal to the metal line level above the via. The line pattern is extended past the elongated via patterns. Transfer of the two patterns into the interlayer dielectric defines vias by the coincidence of the line and via pattern, which accommodates mask alignment and overlay issues. The via pattern is elongated so that the line and via pattern have a maximum overlay error in the direction orthogonal to the line. Thus, the width of the via in the direction orthogonal to the line will still correspond to the line width.

Zhang et al., U.S. Pat. No. 7,380,231 describes a method to spread wires in an IC layout. Given a routed layout as an input, the method adjusts the input layout by spreading wires based on design rules or available spacing. This method is inapplicable for layouts constrained to having wires are at the minimum allowed spacing, as the method seeks to increase wire-to-wire spacing to more than the minimum spacing requirement without causing any design rule violations.

Bergman Reuter et al. U.S. Pat. No. 7,930,667 describes a method that adjusts the layout of wires and vias to reduce opens and shorts. Spacing between vias and wires are increased by several layout adjustments. Plural small vias in a routed layout are replaced by larger vias and vias of different shapes, vias are shifted away from adjacent vias and wire edges, and wire widths are reduced. The impact of layout adjustment on time-dependent dielectric breakdown is unaccounted for in the adjustment, however, and may produce poor time-dependent dielectric breakdown reliability. For example, the layout adjustment method might apply a wire width reduction larger than what is required to meet a time-dependent dielectric breakdown reliability target.

Various models for time-dependent dielectric breakdown reliability have been proposed. Models show that slightly enlarging interconnect spacing can change dielectric mean time to failure in technology with small interconnect spacing. One model is provided by Y. K. Siew, et al., "Line Edge Roughness (LER) Correlation and Dielectric Reliability with Spacer Defined Double Patterning (SDDP) at 20 nm Half Pitch" (*IEEE International Interconnect Technology Conference and* 2011 *Materials for Advanced Metallization*, pp. 1-3). This model defines the relationship between dielectric mean time to failure as follows:

$$\text{mean time to failure} \propto \exp(A(V/S)^m) \quad (1)$$

where parameters V and S are the voltage and spacing of interconnects under investigation, and parameters A and m are fitting parameters that can be calibrated with measurement data obtained from time-dependent dielectric breakdown test-structures.

Another model is provided by M. Bashir and L. Milor, "Towards a Chip Level Reliability Simulator for Copper/Low-k Backend Processes," *IEEE Design Automation and Test in Europe*, pp. 279-282 (2010). This is a chip-level time-dependent dielectric breakdown reliability model of a chip, which can be written as $$t_f = \left(-\ln(1 - F_{chip})^{1/\beta} \cdot H \cdot \sum_{ij} \zeta_{ij}\right) \quad (2)$$

$$\zeta_{ij} = (1/L_{ij})^{1/\beta} \cdot \exp(-\gamma V^m \cdot S_{ij}^{-m})$$

where $\beta$, $\gamma$ and H are model fitting parameters, which can be calibrated with time-dependent dielectric breakdown measurement data. $F_{chip}$, is a user-defined chip failure rate, which has a value ranging from zero to one. $S_{ij}$ is the spacing between interconnects i and j, $L_{ij}$ is the length of the dielectric between interconnects i and j. The model described in Equation (2) assumes that the dielectric is always under electrical stress.

While time-dependent dielectric breakdown reliability has been studied and characterized, time-dependent dielectric breakdown remains a major reliability issue for advanced integrated circuit technology, especially with the push to achieve reliability with sub 45 nm nodes. spacing and voltage trends projected by the International Technology Roadmap for Semiconductors (ITRS) lead to an increasing electric field as technology scales. Since time-to-failure reduces with an increasing electric field, time-dependent dielectric breakdown will be a major reliability concern for back-end-of-line dielectric. At the 20 nm node size (sub-70 nm local metal pitch) with litho-etch-litho-etch double-patterning, time-dependent dielectric breakdown reliability is a primary limiter to further wiring density improvement. When the via-to-wire spacing is reduced from 70 nm to 60 nm due to via misalignment, the electric field around the via is 25% higher than the average electric field between the wires. Moreover, the via-to-wire misalignment is expected to worsen in advanced technology when the vias must land on wires that are misaligned due to litho-etch-litho-etch double-patterning Such a worsening time-dependent dielectric breakdown reliability trend will limit wiring pitch and/or the maximum allowed supply voltage.

The present invention provides a layout adjustment method which accounts for dielectric reliability. Since the invention improves time-dependent dielectric breakdown reliability with layout adjustment, it can be applied in complement to the above discussed and other state-of-the art manufacturing techniques.

SUMMARY OF THE INVENTION

A preferred method is a method for adjusting a layout used in making an integrated circuit. One or more interconnects in the layout that are susceptible to dielectric breakdown are selected. One or more selected interconnects are adjusted to increase via to wire spacing with respect to at least one via and one wire of the one or more selected interconnects. Layout adjustments including changes made by said moving are provided. Preferably, the selecting analyzes signal patterns of interconnects, and estimates the stress ratio based on state probability of routed signal nets in the layout. In preferred embodiments, an annotated layout is provided that describes distances by which one or more via or wire segment edges are to be shifted. In a preferred embodiment, an optical proximity correction solution is provided that contains at least one shifted via or wire edge as a layout adjustment. IC manufacturing proceeds with an adjusted layout. With an annotated layout, rejection by a design rule checker can be avoided, though the adjusted layout may violate a design rule if presented to the DRC. Adjustments can include thinning and shifting of wire segments, and rotation of vias.

BRIEF DESCRIPTION OF THE DRAWINGS

FIGS. 3A and 3B respectively illustrate an exemplary layout and adjusted layout in accordance with a layout adjustment of the invention for an area of an interconnect pattern include a wire that has a via and is surrounded by a rectangular straight wire and a polygonal wire;

FIGS. 4A and 4B respectively illustrate an exemplary layout and adjusted layout in accordance with a layout adjustment of the invention for an area of an interconnect pattern include a wire that has a rectangular shaped via and is surrounded by two rectangular straight wires;

FIGS. 5A-5I illustrate preferred rules for layout adjustments in accordance with a layout adjustment method of the invention;

FIGS. 13A and 13B illustrates a preferred technique for defining edge segments to be shifted;

FIGS. 14A and 14B show part of a layout of and M2 layer of a JPEG testcase before and after the layout adjustment in accordance with the invention.

DESCRIPTION OF THE PREFERRED EMBODIMENTS

Figure 1C:
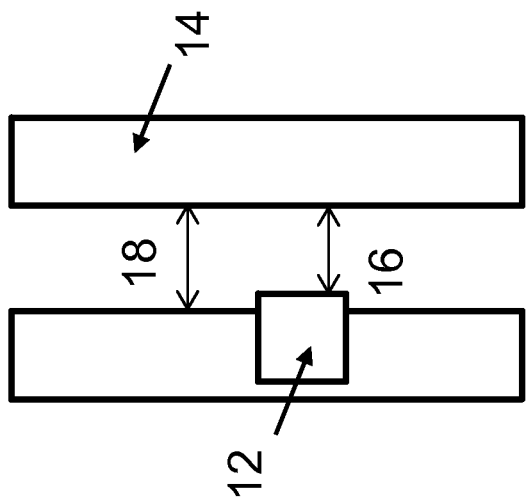
FIGS. 1A-1C are schematic diagrams that illustrate an aligned layout and via-to-wire spacing (FIGS. 1A and 1B) and reduced via-to-wire spacing caused by misalignment of a via.

The invention provides systems and methods for adjusting a layout used in making an integrated circuit. One or more interconnects in the layout that are susceptible to dielectric breakdown are selected. One or more selected interconnects are adjusted to increase via to wire spacing with respect to at least one via and one wire of the one or more selected interconnects. The adjusted layout is used to manufacture an IC. The layout can be used by a lithography system. Layout adjustments including changes made by said moving are provided. In a preferred method, the providing creates annotated layout that defines one or more geometry adjustments to be performed on the one or more selected interconnects. In another preferred method, the providing comprises creates an adjusted layout that defines the pattern for the one or more selected interconnects. Preferred embodiments are implemented in optical proximity correction tool. Selected interconnect can include a square or rectangular vias and rectangular or polygonal wires, for example. Adjusting can include, wire thinning, creating notches, wire segment moving, and via rotation.

In preferred embodiments, the selection of interconnects to be adjusted is based upon an analysis of signal patterns of interconnects. The analysis preferably estimates the stress ratio based on state probability of routed signal nets in the layout.

Moving a wire edge segment can shifting an edge more than 50% of via width and less than 200% of minimum spacing of the layout pattern. It can include shifting an edge more than 50% of via width and less than 300% of via width. It can include shifting an edge more than 50% of via width and less than via width+200% of wire pitch of the layout. It can include shifting an edge more than 35 nanometers and less than 175 nanometers for an adjacent via having a via width larger than 30 nanometers and less than 40 nanometers. It can also include shifting an edge more than 35 nanometers and less than 350 nanometers for an adjacent via with via width larger than 35 nanometers and less than 70 nanometers. It can include shifting an edge more than 70 nanometers and less than 5 micrometers for an adjacent via having a via width larger than 70 nanometers and less than 1 micrometer. It can include shifting an edge more than 0% of and less than 15% of the original wire width, or shifting an edge more than 0% of and less than 15% of original via to wire spacing. It can include shifting an edge more than 0 nanometer and less than 5 nanometers when via width is larger than 30 nanometers and less than 40 nanometers. It can include shifting an edge more than 0 nanometer and less than 10 nanometers when via width is larger than 35 nanometers and less than 70 nanometers. It can include shifting an edge more than 0 nanometer and less than 20 nanometers when via width is larger than 70 nanometers.

A method for making an IC using an annotated layout includes preparing an annotated layout that includes information describing distances by which one or more via or wire segment edges are to be shifted. An adjusted layout is produced that contains at least one shifted via or wire edge. An IC is fabricated using the adjusted layout produced. The information can describe widths, lengths and distances of at least one via edge or at least one wire edge segment to be shifted. The information can be formatted to allow the adjusted layout to pass design-rule checks of a design rule checker (DRC) tool even though the adjusted layout may violate a design rule if presented to the DRC. The information can be readable by an electronic design automation (EDA) tool.

A method for making an IC using an annotated layout includes preparing an annotated layout that includes information describing distances by which one or more via or wire segment edges are to be shifted. An optical proximity correction (OPC) solution is produced that contains at least one shifted via or wire edge as a layout adjustment. An IC is fabricated using the OPC solution for lithography during fabrication of the IC.

The invention provides systems and methods for layout adjustment to produce exposure layouts that can be used to perform double patterning lithography (DPL), for example. Preferred embodiment methods of the invention are executed by a computer.

A preferred system of the invention includes a system for IC layout adjustment that provides a layout to an optical lithography system. The optical lithography system uses the layout to pattern material, e.g., photoresist. The system develops the material to provide a mask that is then used to fabricate sub-wavelength integrated circuit features. The system for layout adjustment, as described in the present invention, or any of its components, can be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention. The computer system can comprises a computer, an input device, a display unit, and the Internet. The computer comprises a microprocessor, which is connected to a communication bus. The computer also includes a memory, which can include Random Access Memory (RAM) and Read Only Memory (ROM). The computer system further comprises a storage device which can be a hard disk drive or a removable storage drive such as a floppy disk drive, optical disk drive, and so forth. The storage device can also be other similar means of loading computer programs or other instructions into the computer system. The computer system executes a set of instructions that are stored in one or more storage elements, in order to process input data. The storage elements can also hold data or other information, as desired. The storage element can be in the form of an information source or a physical memory element present in the processing machine. Exemplary storage elements include hard disk, DRAM, SRAM and EPROM. The storage element can also be external to the computer system, and connected to or inserted into the computer, for download at or prior to the time of use. Examples of such external computer program products are computer-readable storage media such as CD-ROMS, flash chips, floppy disks, and so forth. The set of instructions can include various commands that instruct the processing machine to perform specific tasks, such as the steps that constitute the method of the present invention. The set of instructions can be in the form of a software program. The software can be in various forms, such as system software or application software. Further, the software might be in the form of a collection of separate programs, a program module with a larger program, or a portion of a program module. The software might also include modular programming in the form of object-oriented programming. The software program containing the set of instructions can be embedded in a computer program product, for use with a computer. The computer program product comprises a computer-usable medium having a computer-readable program code embodied therein. The processing of input data by the processing machine can be in response to user commands or in response to results of previous processing, or in response to a request made by another processing machine.

Preferred embodiments of the invention will now be discussed with respect to the drawings. The drawings may include schematic representations, which will be understood by artisans in view of the general knowledge in the art and the description that follows. Features may be exaggerated in the drawings for emphasis, and features may not be to scale.

It will first be noted that a number of time-dependent dielectric breakdown reliability measurement techniques can be used in the invention. Specifically, various time-dependent dielectric breakdown models can be used to represent the relationship between dielectric breakdown time, $t_f$ and spacing. Example techniques include those described with respect to Equations (1) and (2) in the background. With regard to the Bashir and Milor technique of Equation (2), the model can be improved according to an embodiment of the invention by taking into considering the signal pattern of interconnects. Signal pattern is defined as sequence of digital logic states, i.e., signal voltage levels, of interconnects during a particular time interval such as the lifetime of a given chip. The difference in voltage establishes a field that can cause dielectric breakdown over time. To account for the scenario where the dielectric has different stress time, the breakdown time can be described as $$t_f = (-\ln(1 - F_{chip}))^{1/\beta} \cdot H \cdot \sum_{ij} (\alpha_{ij} \cdot \zeta_{ij}) \quad (3)$$

where $\alpha_{ij}$ is a ratio ranging from 0 to 1, representing the total amount of time (normalized to product lifetime) when the interconnects have opposite signals. For example, $\alpha_{ij}=0$ means the interconnect i and j will always have the same signals, and $\alpha_{ij}=1$ means they will always have opposite signals. For a pair of interconnects, $\alpha_{ij}$ can be calculated in a variety of ways. For example, one can apply input vectors as stimulus within a gate-level simulator (e.g., Synopsys VCS) to obtain a "value change dump" (VCD) file. The VCD file contains information about the logic values of the interconnects in the IC design, and when the logic values change over time. $\alpha_{ij}$ of the interconnect pair can be obtained by extracting the fraction of total time when the logic signals on the interconnects are different.

As another example, one can estimate total stress time for interconnects with state probability (i.e., the probability of an interconnect has a logic state '1'). The state probability of all interconnects can be obtained from EDA tools through vectorless logic simulation, which is faster than the cycle-by-cycle simulation based on input vectors. Since the state probability only specifies the probability of logic state '1' but not the time corresponds of logic state, we can assume the interconnects have the worst-case signal distribution along the time axis, so that the resulting stress time and lifetime estimation is conservative. Given the state probabilities of two interconnects, the worst-case scenario (maximum stress time) is when one interconnect has logic state '1' at the beginning of a period of time and the other interconnect has logic state '0' at the beginning of the same period of time. In this case, the interconnect pair is being stressed at the beginning and at the end of the time period. Based on this observation, we can calculate the worst-case stress ratio, $\alpha_{ij}$, for each interconnect pair:

$$\alpha_{ij} = \begin{cases} P1_i + P1_j & \text{if } (1 - P1_i) > P1_j \\ (1 - P1_i) + (1 - P1_j) & \text{if } (1 - P1_i) \le P1_j \end{cases} \quad (4)$$

where $P1_i$ is the probability of the interconnect i has a logic '1'.

In actual VLSI chips, the interconnect spacing $S_{ij}$ may vary from its nominal value due to mask misalignment, lithography-induced spacing variation etc. To account for the impact of the spacing variation on chip-level time-dependent dielectric breakdown reliability, we can divide the range of $S_{ij}$ into finite intervals and using the following equation and calculate the expectation of $\zeta_{ij}$.

$$\zeta_{ij} = \sum_n cdf(S_{ij\_n}) \cdot (1/L_{ij})^{1/\beta} \cdot \exp(-\gamma V^m \cdot S_{ij\_n}^{-m}) \quad (5)$$

where $S_{ij\_n}$ is the mean value for the $n^{th}$ interval of $S_{ij}$ and $cdf(S_{ij\_n})$ is the cumulative probability of the $n^{th}$ interval of $S_{ij}$.

Preferred embodiments of the invention adjust an interconnection layout. The preferred embodiments of layout adjustment for time-dependent dielectric breakdown can achieve improved dielectric mean time to failure compared to an original interconnection layout. Preferred embodiments adjust layouts by selectively shifting, wire segment edges enlarge spacing and by selectively thinning portions of signal wire segments. Interconnect edges are slightly shifted for portions of signal wire segments.

Figure 1B:
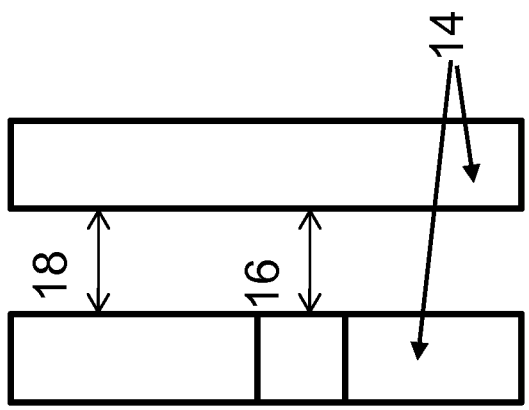
Figure 1A:
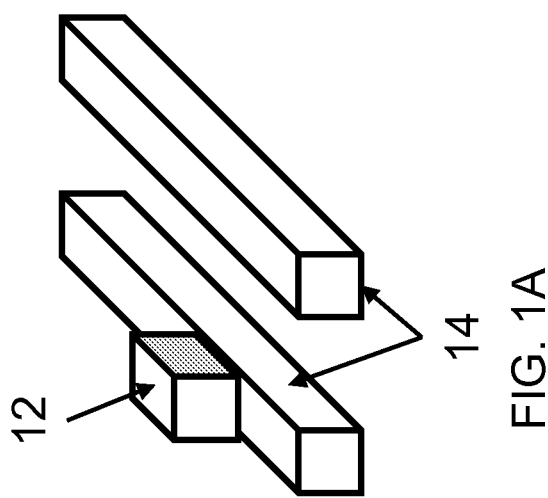

Preferred methods of the invention can be understood with respect to edge shifting operations on example signal lines in the neighborhood of vias. FIGS. 1A & 1B illustrate an aligned layout with a via 12 and wires 14. Via-to-wire spacing 16 is the same as the wire-to-wire spacing 18 when there is no misalignment between the via and wire photomasks during lithography, as illustrated in FIGS. 1A and 1B. Often, however, the limits of photolithography will create a misalignment between the via and wire photomasks, which results in reduced via to wire spacing 16 as shown in FIG. 1C. The via-to-wire spacing 16 can be smaller than wire-to-wire spacing 18 in this instance. Dielectric between via 12 and wire 14 is more likely to break down due to the smaller spacing via-to-wire 18.

Figure 2:
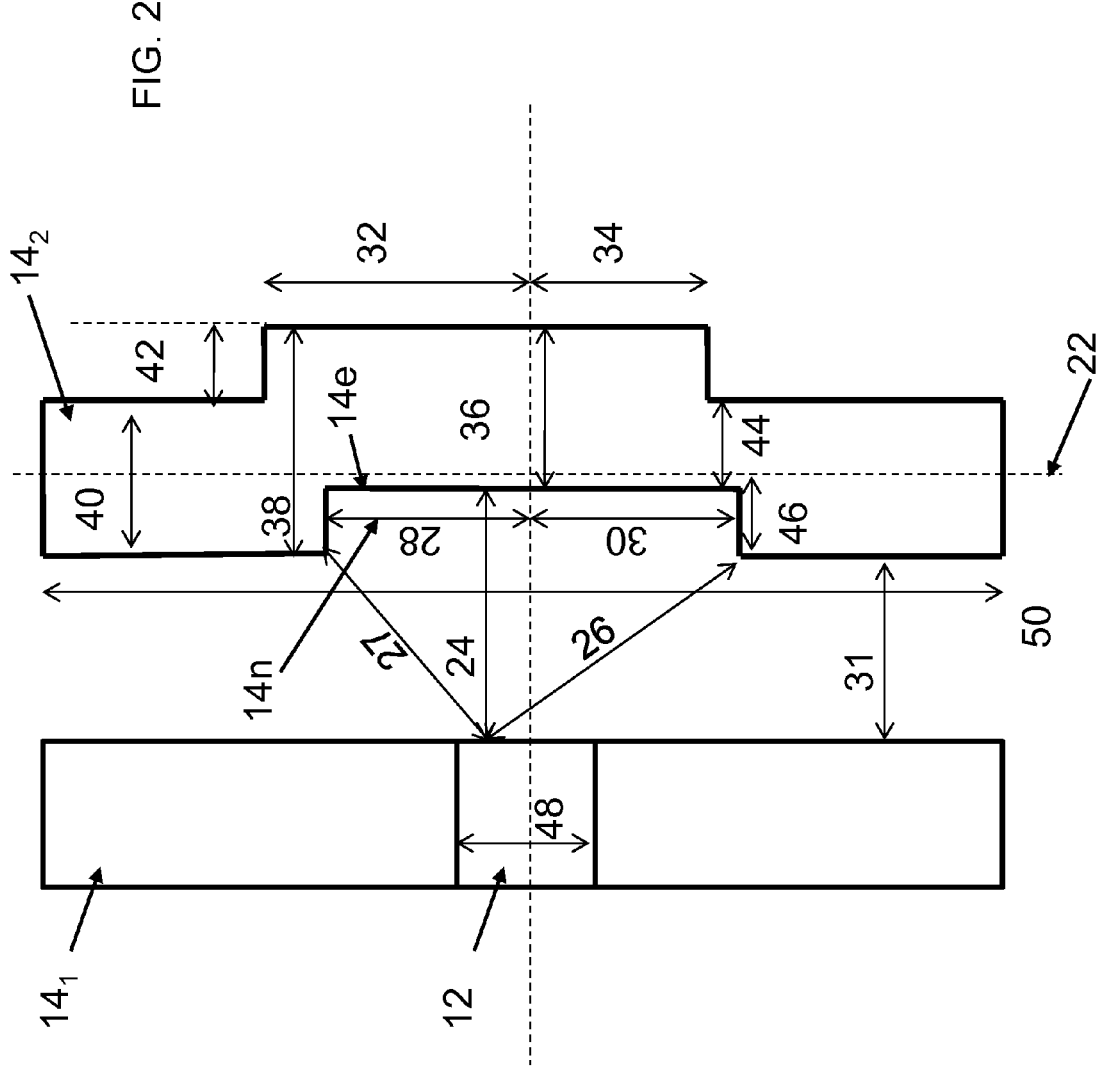
FIG. 2 illustrates an exemplary layout adjustment that can be conducted to mitigate the risk shown in FIG. 1C after analysis of layout and dielectric breakdown risk in accordance with an embodiment of the invention.

FIG. 2 illustrates an exemplary layout adjustment that can be conducted to mitigate the risk shown in FIG. 1C after analysis of layout and dielectric breakdown risk in accordance with an embodiment of the invention. The FIG. 2 example adjusts the layout by shifting a segment of signal wire $14_2$ on the right to form a notch 14n in a region of the interconnect pattern that is in the vicinity of the via 12. The notch 14n shifts a wire edge segment 14e in the wire $14_2$ away from the via 12 toward a wire center line 22 to enlarge via-to-wire spacing. The via-to-wire spacing is determined by the lengths 24, 26, 27, 28 and 30 that define the notch 14n. The notch is also defined by the lengths of edges, distance 31 between primary edges, distances of shift 32, 34, 36, 38, 40, 42, 44, 46, and 50. The via has a length 48.

A small notch 14n can have a significant effect on the spacing 24, which dominates time-dependent dielectric breakdown reliability. Since the layout adjustment only changes a fraction of the wire by slightly shifting segment edges with a small notch, the layout adjustment has little impact on circuit performance. In addition, contrary to conventional practice and thinking in the art, the selective and intentional introduction of a notch 14n does not make the lithographic pattern unnecessarily complex. With node sizes of 45 nm and smaller, the lithography mask patterns for straight signal wire with uniform width already include many notch-like portions. The notch 14n adds no significant complexity to the lithographic processing, though artisans typically strive to increase the number and length of straight signal wire segments.

Artisans and past efforts would normally seek to avoid the notches added in preferred embodiments. Conventional semiconductor manufacturing favors layouts that maximize straight wire segments with uniform widths. Generally, making wires with uniform width is lithography-friendly, i.e., less pattern complexity. The present inventors have recognized that with via-to-wire spacing becoming smaller with ultra small node sizes, the time-dependent dielectric breakdown (time-dependent dielectric breakdown) is a major reliability issue for semiconductor integrated circuits. Increasing the via-to-wire can be beneficial (for improved reliability or performance) at the cost of somewhat more complex lithography. However, the amount of extra complexity is surprisingly small in contrast to conventional though, as the 75 nm and lower node size circuits already have a level of complexity that will not be significantly impacted by the invention.

The length of edges 24, 26, 27, 28, 30, 32, 42 and the shifting distances 44, 46 can be adjusted to reduce the changes in resistance and capacitance of the wire 14b so as to reduce the impact of the layout adjustment on circuit performance. For example, when extra spacing is available, the right wire edge segment caused by the notch 14n (total length of the sum of 32 and 34) can be shifted away from the center line 22 to reduce wire resistance. The various lengths defined in the example of FIG. 2 can be selectively altered, and need not be equal. For example, the lengths 28 and 30 can be different, and so can the lengths 26 and 27. For edges 28, 30 closer to the via 12, the lengths are preferably larger than or equal to 50% of the length 48 of the via 12 to increase the distances 26 and 27 between the via 12 and the corners of the notch 14n. Edges farther away, such as 32 and 34, are less important regarding affect on dielectric breakdown. However, it is preferred that the edge lengths 32 and 34 are larger than the lengths of the edge segments 28 and 30, so that the wire width 36 is not significantly smaller than the original wire width 40.

An example set of parameters provides an example embodiment for a process technology with a 70 nm wire pitch. Table 1 provides the preferred adjustment parameters.

TABLE 1

Layout adjustment parameters.

| Wire width 40 | Via width 48 | Via-to-wire spacing 24 | notch edge lengths left (28, 30) | notch distance of edge shifting 46 | notch edge lengths right 32, 34 | notch distance of edge shifting 42 |
|---|---|---|---|---|---|---|
| 35 nm | 35 nm | 35 nm | from 17.5 nm to 50 nm | from −3.5 nm to <0 nm | from 17.5 nm to 50 nm | from −3.5 nm to +10 nm |
| 35 nm to 70 nm | 35 nm to 70 nm | 35 nm | from 35 nm to 50 nm | from −7 nm to <0 nm | from 35 nm to 50 nm | from −7 nm to +20 nm |
| >70 nm | >70 nm | >70 nm | >35 nm | <0 nm | >35 nm | >−70 nm |

FIGS. 3A and 3B respectively illustrate an exemplary layout and adjusted layout for an area of an interconnect pattern include a wire $14_1$ that has a via 12 and is surrounded by a rectangular straight wire $14_2$ and a polygonal wire $14_3$. The adjusted layout in FIG. 3B improves dielectric mean time to failure with the addition of three notches 14n. Backsides 14b of the notches 14n are also shifted to maintain conductivity and capacitance characteristics. Consistent with the examples above, the various distances between can be adjusted for a targeted time-dependent dielectric breakdown reliability with minimal changes in wire resistance and capacitance. In this example, the connections between the surrounding wires do not affect the layout adjustment.

FIGS. 4A and 4B respectively illustrate an exemplary layout and adjusted layout for an area of an interconnect pattern include a wire $14_1$ that has a rectangular shaped via 12r and is surrounded by two rectangular straight wires $14_2$ and $14_3$. The adjusted layout in FIG. 3B improves dielectric mean time to failure by rotating the rectangular shaped via 12r such that its long edges 12rl are parallel to the wires $14_2$ and $14_3$.

Interconnection layouts also have multiple vias in an area of a circuit. back-end-of-line designs will have, for example, wire segments with vias above and below adjacent wire segments. FIGS. 5A-C illustrate a preferred set of rules for adjusting layouts when there are adjacent wire segments with vias located above and below. The original design is in FIG. 5A. FIG. 5B illustrates a decision that produces no adjustment, and FIG. 5C represents a decision that results in a shift using a notch as discussed with respect to FIG. 2. The different decisions in FIGS. 5B and 5C result from a rule that permits edge shifting when no via is located above the wire segment being contemplated for shift. With this, the wire segment on the left should not be shifted, as shown in FIG. 5B. Edge shifting is not allowed on the left wire segment because there is a via located above the wire segment.

In one approach, a rule can prevent moving wire edge segments if a via is located in the layer immediately above or below the layer of the wire segment corresponding to these movable wire edge segments. However, in the approach shown in FIG. 5C, a rule permits shift of wire edge segments if the via is located below the wire segment and there is no via located above the wire segment.

Figure 5D:
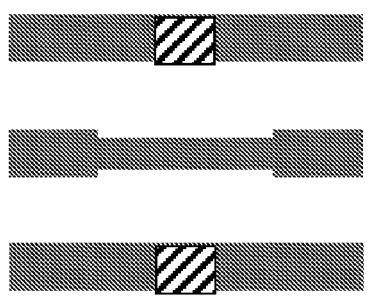
Figure 5E:
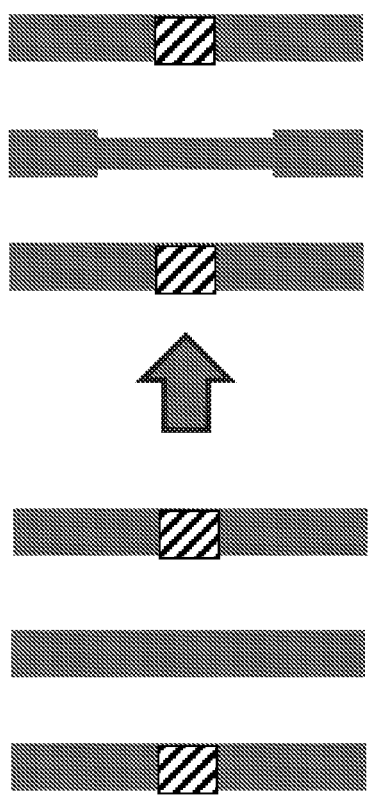
Figure 5F:
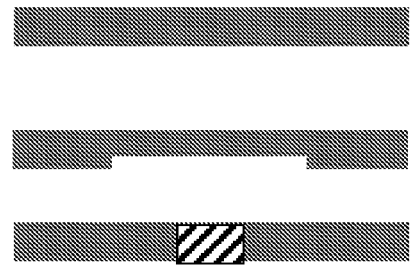
Figure 5G:
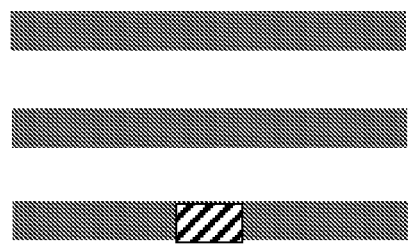
Figure 5H:
Figure 5I:
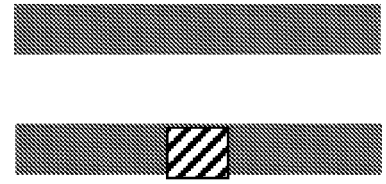

FIGS. 5D and 5E illustrate another rule, which permits thinning of a wire segment by creating notches on both sides of a wire. This rule is applied when wire segments on either side have vias, but the wire segment in the middle does not. FIG. 5F illustrates application of a rule where the wire segment on the left has a via and the wire segment on the right does not, and the wire segment on the right is shifted in accordance with FIG. 2. FIGS. 5H and 5I illustrate a case where a notch is created that thins a wire segment, and the back side of the notch is not moved. The thinning effect in 5E and 5I is slight, but improves dielectric break down performance while maintaining conductivity in the thinned wire segment. Preferably, the wire thinning and/or movement is limited to a small fraction of the total wire width. For example, the wire thinning and/or movement can be 5% of the total wire width.

Figure 5J:
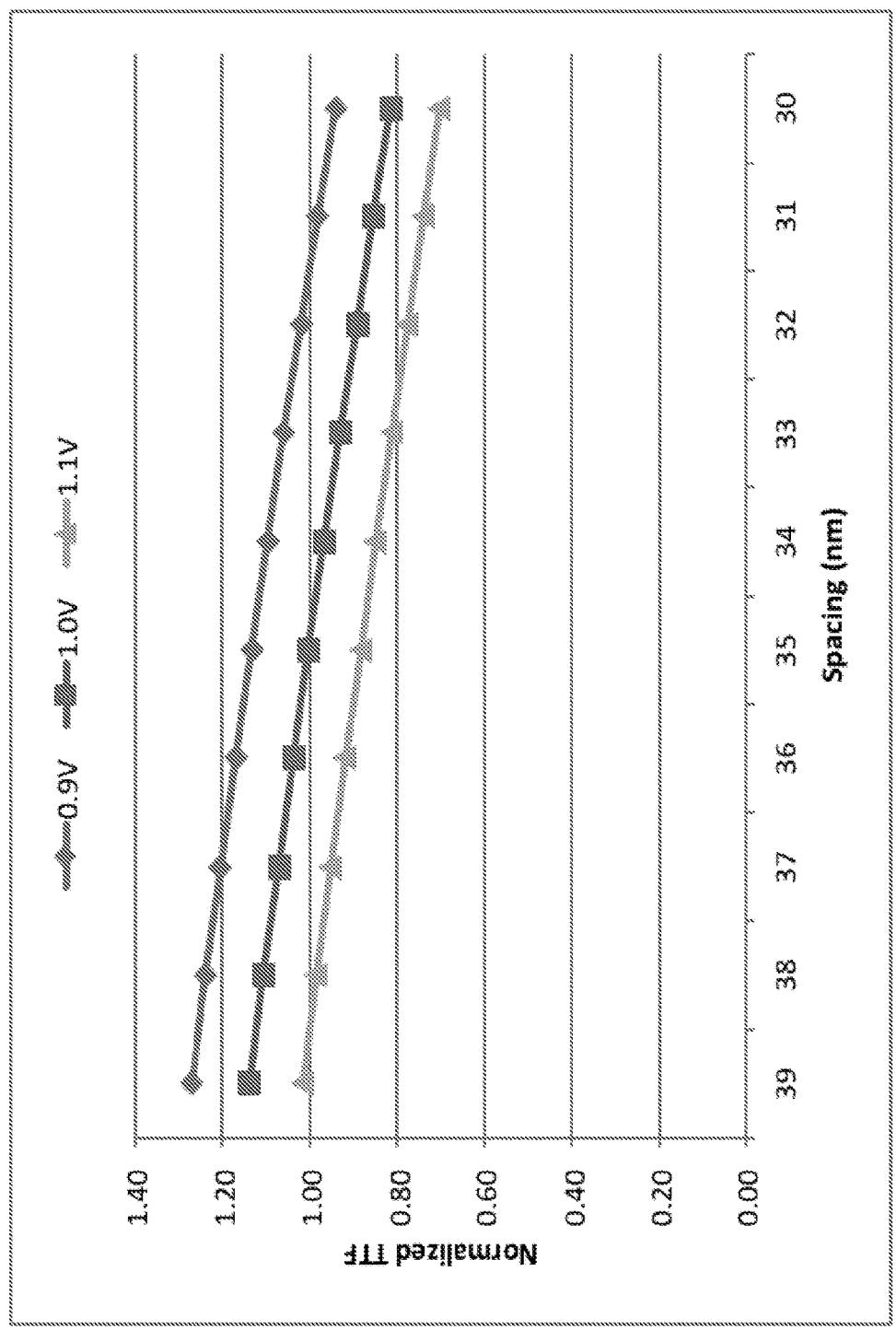
FIG. 5J illustrates calculated dielectric mean time to failure as a function of via-to-wire spacing.

This is shown in FIG. 5J. FIG. 5J shows calculated dielectric mean time to failure using Equation (1) with different voltages for S ranging from 30 nm to 39 nm. FIG. 5J shows that dielectric mean time to failure increases by about 10% when the spacing is increased from 35 nm to 38.5 nm. FIG. 5J also shows that the improved mean time to failure can be traded for a higher supply voltage. In other words, for the same mean time to failure requirement, a higher supply voltage can be used to boost circuit performance.

The interconnect layout adjustment method of the present invention can be applied to a circuit design in many different ways. For example, the photomask maker or IC manufacturer can implement the layout adjustment via optical proximity correction (OPC). Alternatively, electronic design automation (EDA) tool vendors may implement the layout adjustment as part of their software design tool such as a wire router or a design rule checker (DRC) tool. Examples of DRC tool in current usage include, but are not limited to Synopsys Hercules, Mentor Graphics Calibre, Cadence Assura, etc.

An OPC-based implementation allows layout adjustments to occur after a layout has been designed. Although the layout is changed after the circuit is designed, the impact of the adjustments can be limited through having constraints in the layout adjustment flow (e.g., changes in wire R and C are limited and the adjusted layout is pin-compatible with the original layout). The OPC implementation of the edge shifting method allows spacing adjustment, which cannot be achieved through conventional design flow. For example, the conventional combination of OPC and the IC manufacturing processes can only guarantee interconnect width or spacing to be within the best and worst case dimensions (e.g., +/−10% of the nominal spacing or width). An OPC implementation of the edge shifting method will guide the OPC process such that it is extremely unlikely to print a via-to-wire spacing less than 105% of nominal spacing.

Figure 6A:
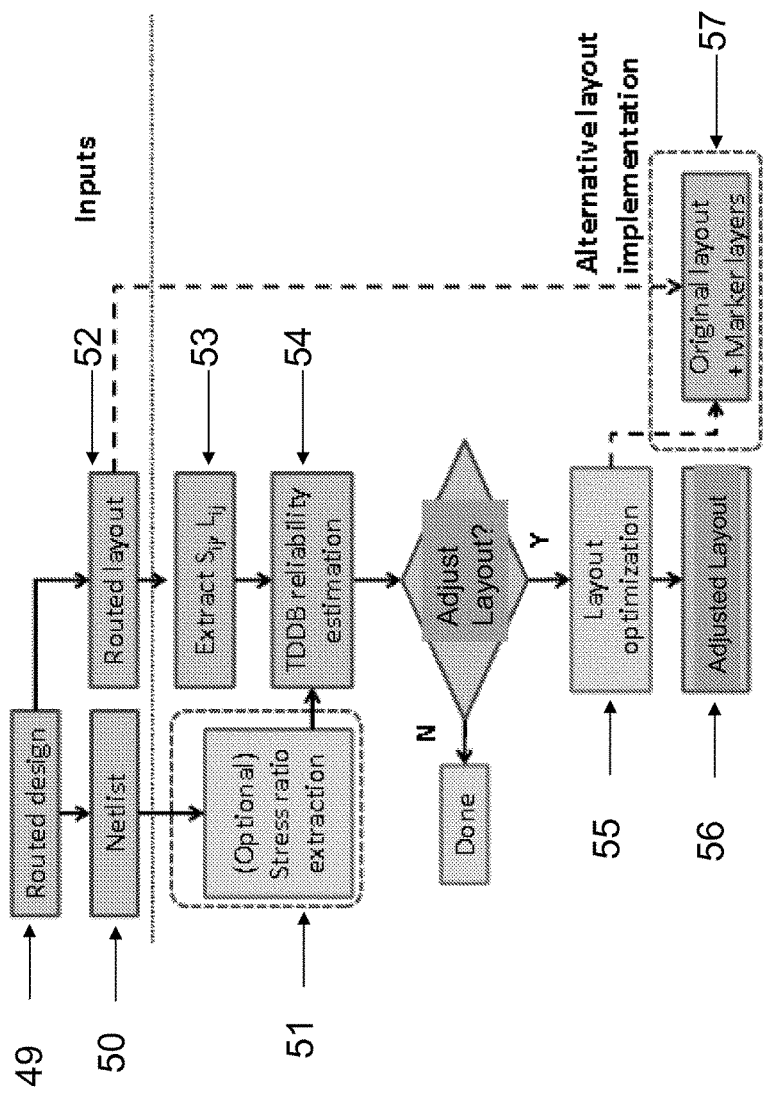
FIG. 6A is a flowchart illustration a preferred embodiment layout adjustment flow of the invention.

FIG. 6A is a flowchart illustration a preferred embodiment layout adjustment flow of the invention. A routed design 49 provides a netlist 50, which is preferably analyzed with signal patterns to estimate 51 a stress ratio. If the design netlist 50 is provided (optimally, with input stimuli), the extract the state probabilities to account for the stress ratio between interconnects instead of assuming that the interconnects are always stressed. Given a routed layout 52, the method also extracts 53 via-to-wire spacings $S_{ij}$ and $L_{ij}$ to calculate the chip lifetime, t, that corresponds to a failure rate, $F_{chip}$ (e.g., 0.5%). Based on the results of reliability estimation, a chip designer can decide whether layout adjustment is needed. If the designer chooses to apply the layout adjustment 55, the layout adjustment 55 will generate an adjusted layout 56 in which the via-to-wire spacings are increased. Alternatively or additionally, the method can also generate marker layers 57, e.g., in tapeout GDSII, to represent the layout adjustments. The marker layers can then be read by an OPC tool flow to shift targeted wire edge locations appropriately during mask data preparation.

Figure 6B:
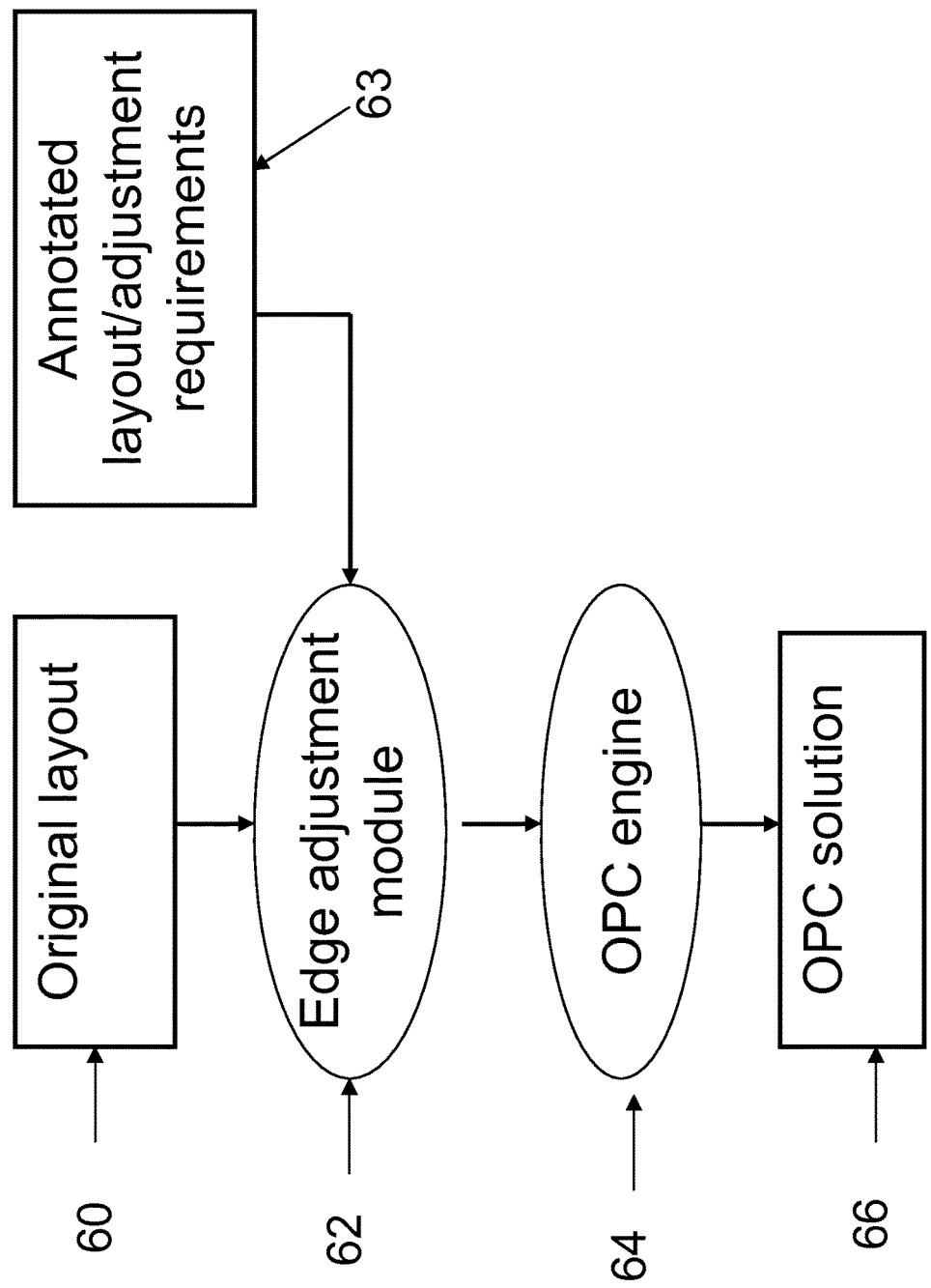
FIG. 6B is a flowchart of preferred embodiment of an optical proximity correction (OPC) implementation of the layout adjustment method of the present invention.

FIG. 6B is a flowchart of preferred embodiment of an OPC implementation of the layout adjustment method of the present invention. An original layout 60 for a circuit is received. The layout is analyzed and adjusted, by edge segment shifting, segment narrowing, and/or via rotation, etc. to produce an set annotated layout/adjustment requirements 63. These are provided to an edge module 62 that makes changes to the OPC process to implement the layout adjustments to improved time-dependent dielectric breakdown. Results from the edge adjustment module are provided to an OPC engine 64 (e.g., Calibre) which yields an OPC solution 66.

An exemplary embodiment of an OPC implementation of the layout adjustment method provides an OPC error "knob" (software setting that can be under operator control). In this embodiment, the OPC implementation can control the direction of OPC error. In particular the OPC implementation can drive OPC for a given edge segment such that the edge is almost always shifted to a direction. For example, if the tolerance on a wire edge is set to +/−5 nm, the OPC implementation will drive OPC such that the wire-edge segment is always close to +5 nm instead of −5 nm.

In another embodiment, an OPC implementation of the layout adjustment method provides an explicit biasing "knob". In this embodiment, the OPC implementation performs explicit biasing of layout edge segments. Bias, error magnitude and error direction are co-optimized to achieve a finer degree of control on edge segment location.

The error and biasing knobs provide an OPC implementation of the layout adjustment without requiring generating the exact adjusted layout in the design process. The implementation of layout adjustment at OPC level also avoids design rule violations at the design level.

Figure 7:
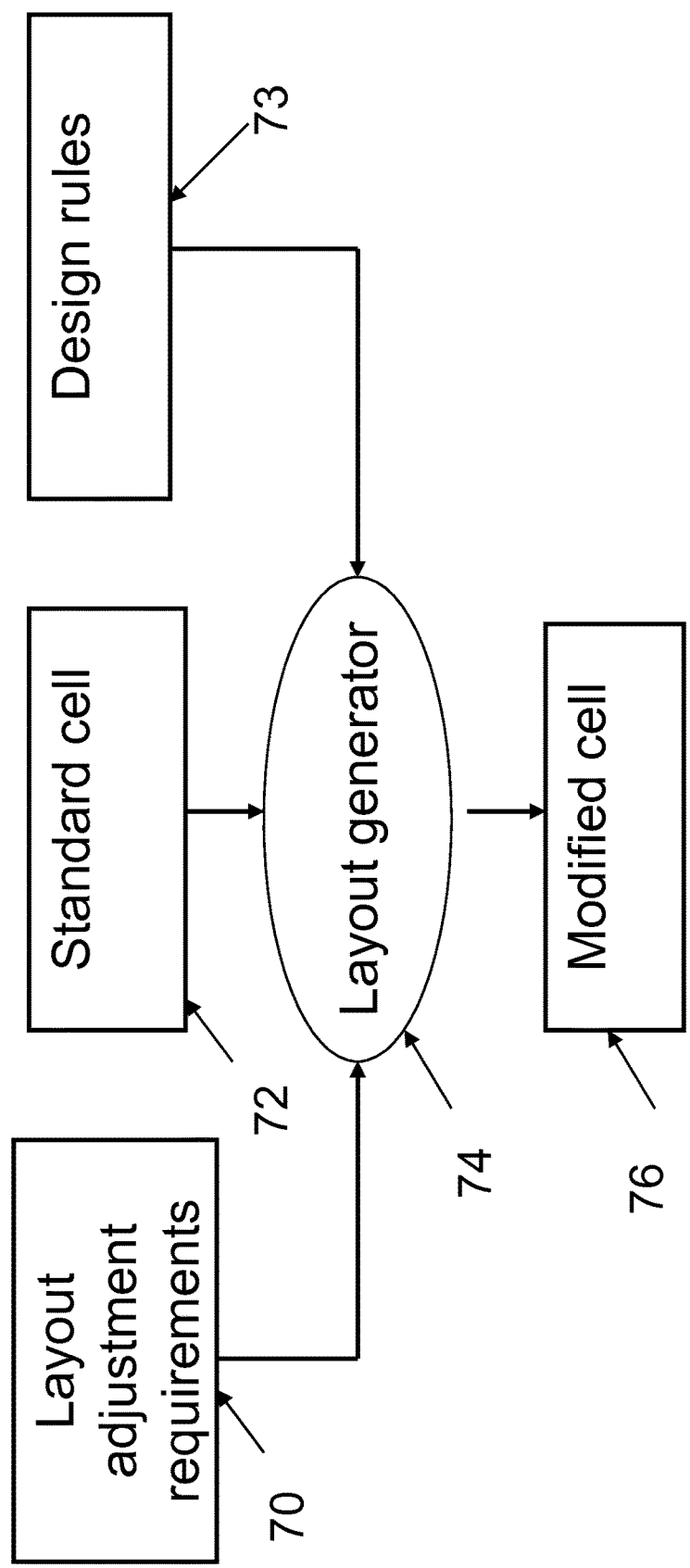
FIG. 7 is a flowchart of a preferred embodiment of a cell library implementation of the layout adjustment method of the present invention.

FIG. 7 is a flowchart of a preferred embodiment of a cell library implementation of the layout adjustment method of the present invention. FIG. 7 shows that layout adjustment can be implemented by generating a cell library adjusted for time-dependent dielectric breakdown based on design goals and methodologies in accordance with the invention. The time-dependent dielectric breakdown adjusted cell library is available to designers so that they can use the cells in an IC design flow. Layout adjustment requirements 70 are determined with the time-dependent dielectric breakdown analysis and adjustment and a standard cell 72 that was analyzed and adjusted are provided to a layout generator 74, which also receives a set of design rules 73 for a particular technology. The layout generator 74 generates the adjusted cells 76 based on the original standard cell 72 in view of the layout adjustment requirements 70 and design rules 73. In FIG. 7, the layout generator produces a adjusted cell 76. As is typical in cell library implementation, manual editing of one or more layouts can also occur.

Figure 8:
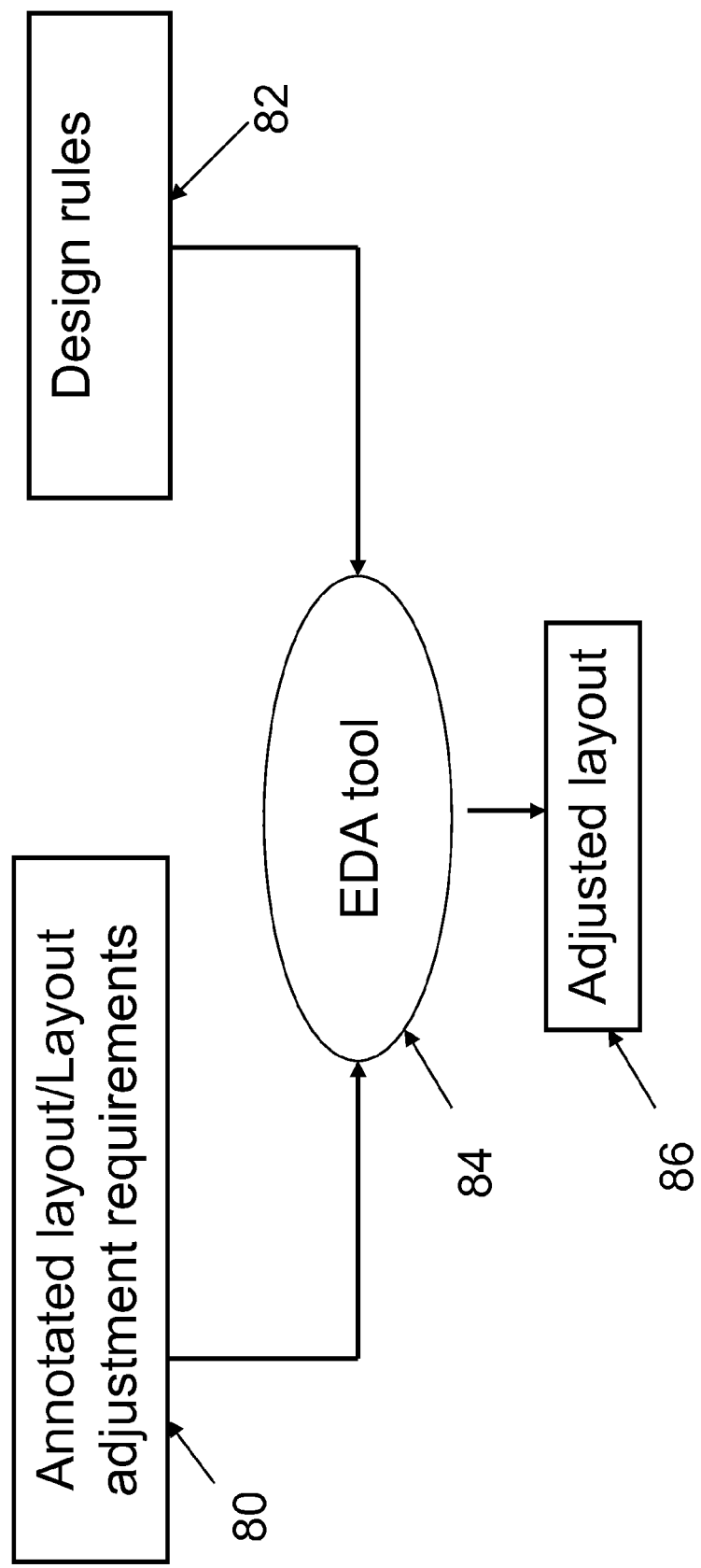
FIG. 8 is a flowchart of a preferred embodiment electronic design automation (EDA) tool implementation of the layout adjustment method of the present invention.

FIG. 8 is a flowchart of a preferred embodiment EDA tool implementation of the layout adjustment method of the present invention. In this implementation, the method of this invention is implemented at the EDA tool level, for example, as part of a design rule checking (DRC) or other physical verification tool. An annotated layout or set of layout adjustment requirements 80 generated from analysis and adjustment to enhance time-dependent dielectric breakdown is provided with design rules 82 to an EDA tool 84 (e.g., Mentor Graphics Calibre, Synopsys Hercules). The EDA tool 84 uses the adjustments 80 and design rules 82 to generate a adjusted layout of the IC 86. Since the DRC tool can differentiate the geometries of the original layout and the geometries of layout adjustments, different design rules can be applied to check the geometries of original layout and the geometries that arise from layout adjustments. Thus, layout adjustments are not constrained to satisfy the design rules for the original layout and can still pass design rule checks.

Figure 9:
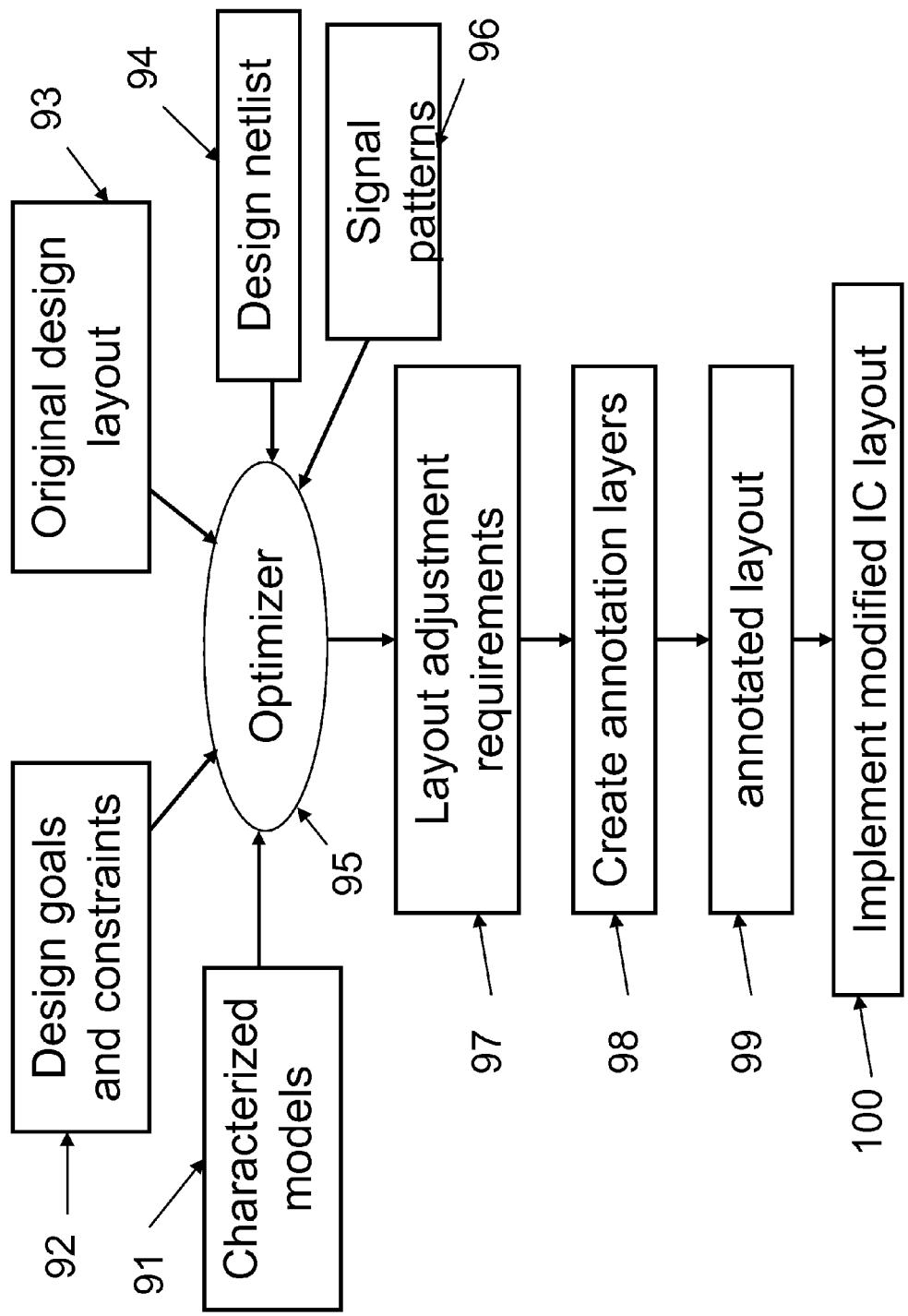
FIG. 9 is a flowchart of an exemplary embodiment of a bias requirement communication method, for example, for the OPC or EDA implementations of FIGS. 6B and 8.

FIG. 9 is a flowchart of an exemplary embodiment of a bias requirement communication method, for example, for the OPC or EDA implementations of FIGS. 6B and 8. An annotated layout, or alternative layout adjustment requirements, is generated and the requirements must be communicated to the OPC or EDA tools. In FIG. 9, an optimizer 90 receives inputs including a set of characterized models 91, a set of design constraints 92, original design layout 93, design netlist 94, signal patterns 96, etc.

The characterized models 91 can include, for example, a time-dependent dielectric breakdown model, a wire resistance model and a capacitance model. The design constraints 92 can include, for example, timing, power, yield, etc. The optimizer 95 uses the inputs to generate layout adjustment requirements 97 for the interconnects. In this example, the layout adjustment communication method creates an annotation layer 98 of shapes for every distinct edge segment shift. The shapes on annotation layer can also be referred to as markers. For example, the annotation layer may include edge segment shift of 2 nm markers for all edge segments requiring a 2 nm shift. The result is an annotated layout 99, which yields a layout adjustment 100 to provide to the OPC and EDA tools.

Figure 10C:
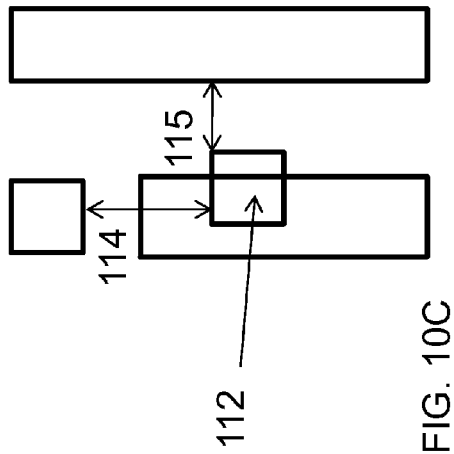
FIGS. 10A-10E illustrate a rule for a preferred method to achieve alignment control.
Figure 10E:
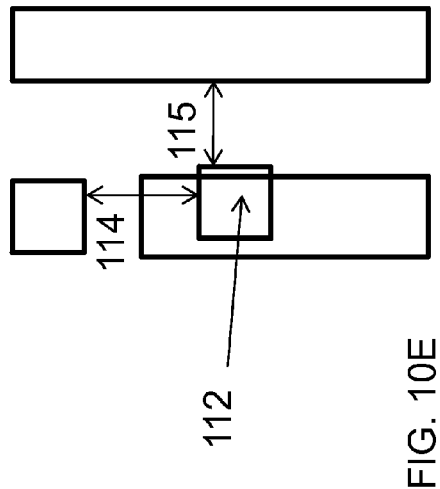
Figure 10B:
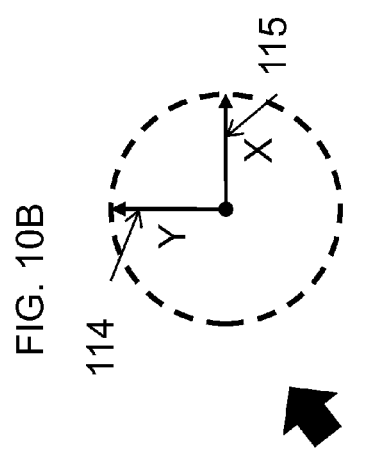
Figure 10D:
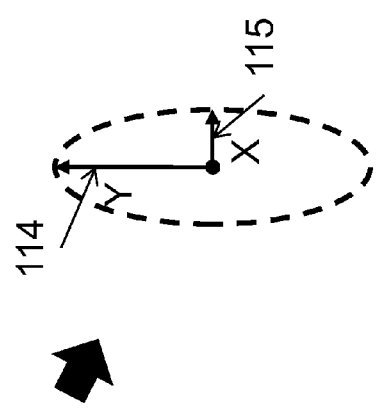
Figure 10A:
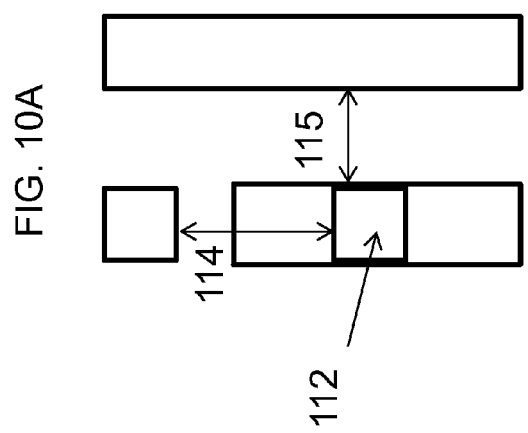

In accordance with preferred embodiments, after layout adjustments, dielectric mean time to failure can be further improved through alignment control. An example layout in FIG. 10A shows that via 112 is more sensitive to misalignment in the X-direction compared to the Y-direction because the X-direction via-to-wire spacing 115 is much smaller than the Y-direction via-to-wire spacing 114. One can increase dielectric mean time to failure by adjusting the alignment such that misalignment tolerance is smaller in the X-direction 115 compared to Y-direction 114. A balanced misalignment tolerance in both X- and Y-directions can lead to a smaller X-direction via-to-wire spacing 115 as compared to the X-direction via-to-wire spacing where misalignment tolerance is skewed. As a result, dielectric mean time to failure is larger for the case with skewed misalignment tolerance. The skewed misalignment tolerance may have a higher misalignment in the Y-direction 114 compared to the case where misalignment tolerances are balanced. However, the Y-misalignment direction is not time-dependent dielectric breakdown critical because the Y-direction via-to-wire spacing is much larger than the X-direction 115 spacing in this example. This example of FIG. 10A shows that one can further improve dielectric reliability by adjusting alignment orientation for the direction with smaller via-to-wire spacing, instead of adjusting the alignment in both directions with the same standards for misalignment tolerance. On the other hand, the preferred alignment direction can also be included in the objective function of layout adjustment, such that the majority of interconnects in the adjusted layout have the same preferred orientation. Therefore, dielectric mean time to failure can be improved by increasing the via-to-wire spacing in an IC layout.

Alternatively or additionally, the via-to-wire spacing can also be increased by controlling photomask alignment orientation. FIGS. 10C and 10E illustrates two examples of photomask alignments and their corresponding layouts. The example in FIG. 10C has no preference in photomask alignment. Therefore, the X-direction misalignment magnitude tolerance of FIG. 10B is the same as the Y-direction misalignment magnitude tolerance. The example of FIG. 10E has a skewed alignment orientation which prefers a smaller misalignment in the X-direction 115 compared to the misalignment in the Y-direction 114, as represented in FIG. 10E. Due to the skewed alignment orientation, the via 112 in FIG. 10E is shifted by a smaller distance in the X-direction 114 compared to the via 112 in FIG. 10C. As a result, the via-to-wire spacing for the case with skewed misalignment is larger compared to the via-to-wire spacing for the case with equal misalignments in both directions.

Figure 11B:
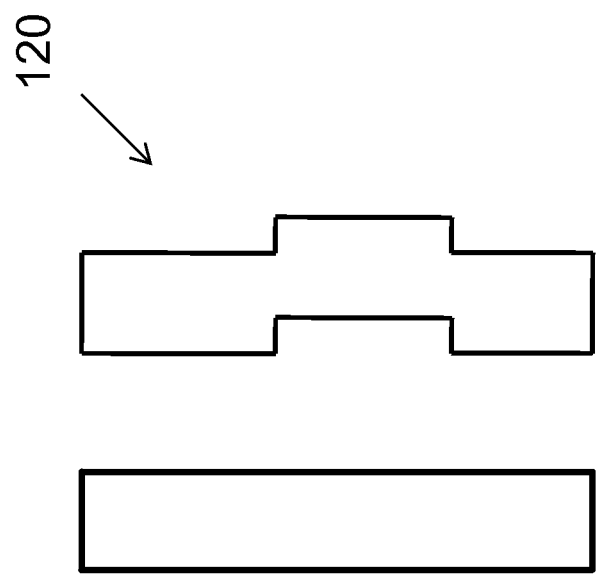
FIG. 11B includes a notch that can be generated by merging outlines of the original layout patterns and the shapes on a separate marker layer, and removing the overlapped outlines.
Figure 11A:
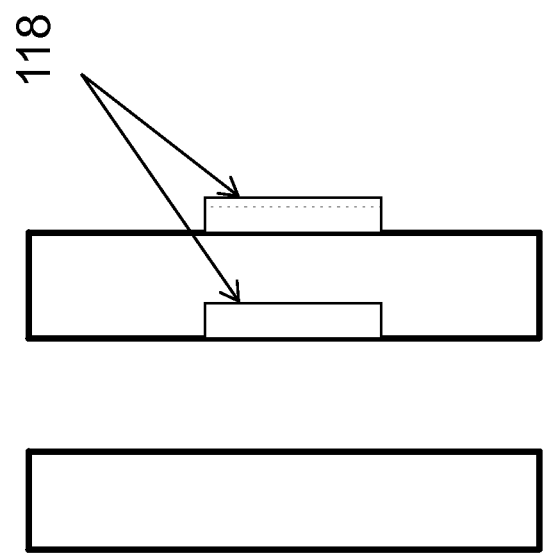
FIG. 11A illustrates original layout patterns overlapped with layout adjustment information generated by method of the invention that are recorded on a separate marker layer as in FIGS. 6B and 9.

As discussed above with respect to FIGS. 6B and 9, the interconnect layout adjustment method may be implemented using optical proximity correction (OPC) tool. OPC is a lithography enhancement technique commonly used to compensate for image distortion due to lithography imperfection. Examples of OPC tools in current usage include, but limited to Mentor Graphics Calibre, Synopsys Proteus, ASML/Brion Tachyon OPC etc. Given an "input layout", an OPC tool generates an OPC solution (a new layout) by adding shapes to the layout and/or shifting the edges of the input layout. The images printed using the OPC solution will match the patterns described in the input layout more closely compared to that printed using the input layout without any adjustment. In the present invention, the layout adjustment information can be provided to an OPC tool together with the original layout, so as to generate an OPC solution with will print patterns with the desired layout adjustments. The information of the layout adjustment can be recorded on separate marker layers (instead of applying the adjustments on the original layout to produce a adjusted layout). For example, FIG. 11A illustrates an original layout patterns overlapped with layout adjustment information 118 that are recorded on a separate marker layer. The desired layout of FIG. 11B includes a notch 120 that can be generated by merging outlines of the original layout patterns and the shapes 118 on a separate marker layer, and removing the overlapped outlines. Recording adjustment information on another layer is useful to enable implementation of desired edge segment shifts, especially when the adjusted layout is not compatible with design rules. For example, when the desired edge segment shift is smaller than the minimum layout grid, applying the adjustments may produce a adjusted layout which does not satisfy design rules. Using the separate marker layer avoids conflict with design rules while providing for improved dielectric mean time to failure.

Before applying rules discussed above with respect to FIGS. 1-5, a received interconnection layout is analyzed to find time-dependent dielectric breakdown-critical interconnections. In a preferred embodiment, the time-dependent dielectric breakdown-critical interconnects can be identified based on their spacings. For example, a layout pattern can be identified as critical when the edge of a wire segment or via is within a pre-defined spacing from another wire segment and/or via. Checking the spacing between vias and their neighboring wire segments can be used to conduct this analysis. Preferably, the signal activity pattern of the interconnects is included to identify the time-dependent dielectric breakdown-critical interconnect because dielectric only degrades when there is a voltage difference between interconnects. To analyze spacing and signal patterns of interconnects, we can calculate the expected dielectric mean time to failure (mean time to failure$_{ex}$) with the following equation.

$$\text{mean time to failure}_{ex} = \text{mean time to failure}_{nom} \times \alpha \times \exp(A(V/S)^m - A(V_{nom}/S_{nom})^m) \quad (6)$$

where mean time to failure$_{nom}$ is the dielectric mean time to failure with nominal supply voltage ($V_{nom}$) and the nominal spacing ($S_{nom}$). The parameters A and m are fitting parameters, which can be calibrated with measurement data obtained from time-dependent dielectric breakdown test-structures. Parameters V and S are the voltage and spacing of interconnects under investigation, and $\alpha$ is the stress ratio of the interconnects. After calculating mean time to failure$_{ex}$ of interconnects, the interconnects can be prioritized (e.g., according to mean time to failure$_{ex}$) for the subsequent layout adjustment steps. Optionally, one may set a threshold on mean time to failure$_{ex}$ such that only the interconnects with mean time to failure$_{ex}$ smaller than the threshold will be adjusted.

After identifying time-dependent dielectric breakdown-critical interconnects, the layout parameters of the identified wires or vias (e.g., depth and length of notches) may be adjusted for different design goals. In an exemplary embodiment, the layout adjustment goal is to maximize time-dependent dielectric breakdown lifetime with minimum wire width ($W_{tar}$) and interconnect spacing ($S_{tar}$) constraints:

Maximize mean time to failure$_{ex}$

Subject to $W_j \geq W_{tar}$ $$S_j \geq S_{tar} \quad (7)$$

mean time to failure$_{ex}$ is the expected mean time to failure of the dielectric between the selected interconnect pair, W is the interconnect width of the $j^{th}$ edge which may be shifted and S(j) is the spacing of the $j^{th}$ edge with adjacent interconnect.

In this exemplary formulation, the objective is to maximize expected dielectric mean time to failure. It should be understood that any number of alternative objectives may be applicable, depending on the design goals for the integrated circuit; examples include but are not limited to: (1) minimizing the maximum perturbation of any edge location from its original location, (2) minimizing R×C (the product of wire resistance and wire capacitance) variation due to layout adjustment, (3) minimizing the number of edge displacement to reduce photomask complexity, (4) minimizing capacitance between interconnects due to layout adjustment, and (5) minimizing any of the above objectives subject to a constraint on interconnect routability.

We may solve the above problem with various algorithmic approaches. An example algorithmic approach solves for the notches' parameters using an exhaustive search. In this approach, we can pre-define a set of trial layout parameters (e.g., notch depth=1%, 2%, 3% of wire width and notch length=100%, 200%, 300% of wire width) for a notch and calculate the mean time to failure$_{ex}$ for each layout resulting from the combinations and choose the layout parameters with the maximum mean time to failure$_{ex}$ while satisfying the constraints. For a layout where more than one selected interconnect are to be adjusted, one may adjust the interconnects one at a time.

In an alternative embodiment, the layout adjustment for a layout with more than one selected interconnect can be formulated as follows:

Maximize $\Sigma$(mean time to failure$_{ex\_i}$)

Subject to $W_j < W_{tar}$ $$S_j < S_{tar} \quad (8)$$

where mean time to failure$_{ex\_i}$ is the expected mean time to failure of the $i^{th}$ selected interconnect pair. For this example, the interconnect pairs may be prioritized and solved by the exhaustive search method one at a time.

Figure 12:
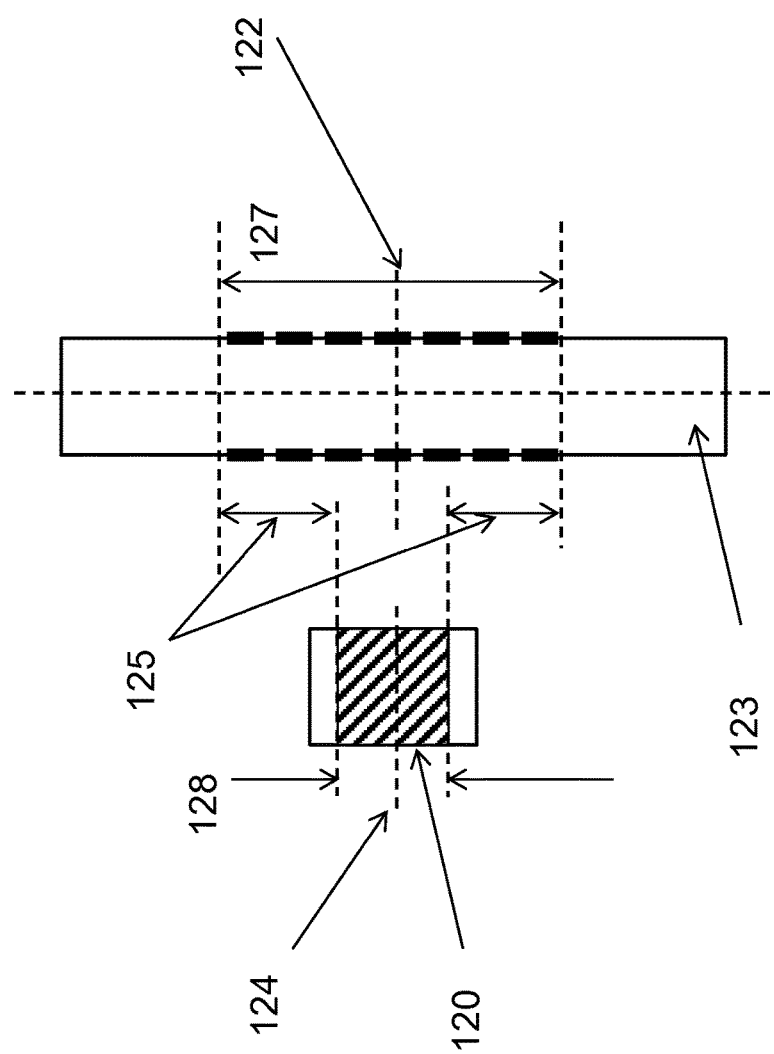
FIG. 12 illustrates details of a preferred method for segmenting and moving an edge segment in the area of a via.

An exemplary embodiment provides a layout adjustment flow for improving time-dependent dielectric breakdown reliability. Given a layout, collect the via-wire pairs if the via-to-wire spacing is smaller than the safe distance, $S_{safe}$. We define $S_{safe}$ as the distance beyond which a dielectric is safe from time-dependent dielectric breakdown (i.e., the dielectric does not breakdown during the expected lifetime of the chip). For each via-wire pair, we define movable wire edges at both sides of a wire so that we can increase the via-to-wire spacing and adjust the wire width by shifting the movable edges. As shown in FIG. 12, a center of the movable wire edge segments 122 is aligned to the center line 124 of a via 120 adjacent to a wire 123. Since the via 120 can be misaligned in the direction parallel to the wire, additional length $L_m$ 125 is added to both ends of movable edge segments to increase the via-to-wire spacing even if there is via misalignment. This makes the length 127 of the movable wire edge segments longer than the via edge 128. The $L_m$ 125 for each end point can also be different and determined according to the via misalignment.

FIGS. 13A and 13B illustrates a preferred technique for defining edge segments to be shifted. The figures show that when, because of the position of two vias 120, the movable wire edge segments 133, 134 are overlapped in a region 135, the movable edge segments are split in FIG. 13B by re-defining the overlapped region 135 as new movable edge segments 137, 138 and 139 to form six movable edges after resolving the overlapped edges.

A preferred set of rules follows:
1) After creating movable wire edge segments for all via-wire pairs, iterate through each via-wire pair and perform layout adjustment;
2) During adjustment, do not make any changes to the movable edge segments, if shifting them reduces the width of a wire segment, which is also the landing pad of a via;
3) For the cases that do not affect wire segments of a via landing pad, both movable edges of a wire segment are shifted. If there is only one via next to the wire, both movable edges are shifted in the same direction. If there are vias on both sides of the wire segment, shift both edges toward the center of wire to increase via-to-wire spacings 140 in a portion of a wire 142 increases the via-to-wire spacing 146 relative to via 146. Results in Table 3 show that applying the layout adjustment method can improve chip time-dependent dielectric breakdown lifetime by 10% on average.

TABLE 3

Chip lifetime normalized to that estimated using DC stress before adjustment.

| | DC stress | | Design-specific stress ratio | |
|---|---|---|---|---|
| | Before Adjustment | After adjustment | Before Adjustment | After adjustment |
| AES | 1.000 | 1.101 | 1.695 | 1.866 |
| JPEG | 1.000 | 1.097 | 2.145 | 2.360 |
| MPEG2 | 1.000 | 1.103 | 2.755 | 3.045 |
| SPARC_EXU | 1.000 | 1.101 | 1.959 | 2.155 |
| Average | 1.000 | 1.101 | 2.139 | 2.357 |

To illustrate the benefit of the layout adjustments in accordance with the invention, the layout adjustment is applied on four layout testcases. In this experiment, we implement (synthesis, place and route) four RTL designs {AES, MPEG2, JPEG, SPARC EXU} obtained from the OpenCores and the OpenSPARC websites. The designs are implemented using Synopsys 32 nm NVT, LVT and HVT libraries. In this experiment, we analyze time-dependent dielectric breakdown reliability of interconnects at layers M2, M3 and M4 using Equations (2), (3) and (5). We calculate $\alpha ij$ of the interconnects using Equation (4) based on the state probabilities obtained by running vectorless logic simulation for each design. The interconnect and time-dependent dielectric breakdown model parameters are listed in Table 2.

TABLE 2

Parameters of layout adjustment experiment.

| Layout parameters | Values | time-dependent dielectric breakdown model parameters | Values |
|---|---|---|---|
| Minimum wire spacing | 80 nm | H | 1.6e19 nm·s |
| Minimum wire width | 80 nm | β | 1 |
| Minimum via-to-wire spacing | 80 nm | γ | 2402.5 nm/Volt |
| Via width ($L_{via}$) | 70 nm | m | 0.5 |
| $L_m$ | 95 nm | V | 1 Volt |
| E | 4 nm | $F_{chip}$ | 0.5% |

FIGS. 14A and 14B show part of the layout of the M2 layer of the JPEG testcase before and after the layout adjustment. The adjustment in FIG. 14B clearly demonstrates that shifting wire edge segments to create the notch We also study the impact of our layout adjustment on wire resistance and capacitance as well as circuit timing. First, we extract the total changes in resistance ($\Delta R$) and capacitance ($\Delta C$) on each net by extracting the changes in wire width and spacing due to the layout adjustment. The results in Table 4 show that the maximum $\Delta R$ is less than 0.25Ω and the maximum $\Delta C$ is less than 0.1 fF for all nets in all designs. This confirms that the layout adjustment has little impact on the wire resistance and capacitance. Second, we evaluate the delay changes due to the layout adjustment for two extreme scenarios. For the gate-worst scenario, we add the $\Delta C$ of a net to the output pin of the driver cell and do not include any $\Delta R$. Then, we run timing analysis to extract the stage delay of the net and calculate the delay difference with respect to the original stage delay without layout adjustment. This setup is designed to estimate the worst-case gate delay variation due to layout adjustment. For the wire-worst scenario, we add the $\Delta C$ resulting from the layout adjustment to the leaf nodes of the net (e.g., input pins of cells driven by the net) and connect the $\Delta R$ in series to the output pin of the cell that drives the net. When there are more than one leaf nodes, we assume the total $\Delta C$ is distributed uniformly among the leaf nodes. Although this may not be the worst-case setup for wire delay variation, having all $\Delta R$ at the output pin and all $\Delta C$ at leaf nodes is likely to increase the wire delay variation. By adding up the delay differences of gate-worst and wire-worst scenario, we obtain a pessimistic estimation of delay variation due to the layout adjustment. Results in Table 4 show that the maximum $\Delta$delay is less than 1.6 ps for both gate-worst and wire-worst scenarios. Meanwhile, the average delay variation is only 0.012 ps for both scenarios. The experimental results show that the layout adjustment method has little effect on circuit timing. Table 4 also shows that about 40% of the nets are perturbed in the layout adjustment.

TABLE 4

The impact of layout adjustment on resistance, capacitance and circuit timing

| | Total nets | Adjusted nets | Max. ΔR | Max. ΔC | Gate-worst Δdelay (ps) | | Wire-worst Δdelay (ps) | |
|---|---|---|---|---|---|---|---|---|
| | | | | | Max. | Average | Max. | Average |
| AES | 14k | 8.0k | 0.088 | 0.046 | 0.793 | 0.017 | 0.969 | 0.018 |
| JPEG | 29k | 9.4k | 0.143 | 0.083 | 0.615 | 0.007 | 0.600 | 0.007 |
| MPEG2 | 10k | 3.4k | 0.144 | 0.056 | 1.578 | 0.012 | 1.580 | 0.012 |
| SPARC_EXU | 15k | 7.0k | 0.246 | 0.076 | 0.649 | 0.011 | 1.090 | 0.011 |
| Average | 17k | 7k | 0.155 | 0.065 | 0.909 | 0.012 | 1.060 | 0.012 |

Another embodiment provides a preferred signal-aware time-dependent dielectric breakdown reliability estimation analysis to identify critical areas of dielectric breakdown, conducts layout adjustment, and then conducts post-routing layout adjustment to improve time-dependent dielectric breakdown reliability. The alternate signal-aware analysis can be used with the above methods in FIGS. 6A-9.

In this embodiment, the identification of critical areas of dielectric recognizes accounts for the probability that dielectric may break down at different times. A Weibull distribution to describe the statistics of breakdown time and model the failure rate of a dielectric between interconnects i and j as follows:

$$F_{ij}(t) = 1 - \exp\left(-\left(\frac{t}{\eta_{ij}}\right)^\beta\right) \tag{9}$$

Where $\beta$ is the shape factor of the Weibull distribution, t is the total stress time of the dielectric, $F_{ij}(t)$ is the probability of the dielectric breaking down before time t and $\eta_{ij}$ is the characteristic lifetime of the dielectric, which can be defined, e.g., as the total stress time until 63.2% of the dielectric samples fail. When 63.2% of the samples fail, the value of Nij is same as t. Let Nij=t often simplifies the cumulative distribution function of the Weibull distribution, i.e., Fij(t)=Fij(Nij)=1×1/e=0.632.

Given an example via-to-wire test structure, the failure probability of the test structure can $F_{ref}(t)$ can be modeled as follows:

$$F_{ref}(t) = 1 - \exp\left(-\left(\frac{t}{\eta_{ref}}\right)^\beta\right) \tag{10}$$

$$\eta_{ref} = A \cdot \exp\left(\frac{-\gamma V^m}{S_{ref}^m}\right)$$

where $\eta_{ref}$ is the characteristic lifetime of the test structure, m is the scalar of a time-dependent dielectric breakdown model and $S_{ref}$ is the via to wire spacing. Since the via-to-wire spacings in a chip can be different from that in a test structure, Poisson area-scaling law can be used to model chip-level time-dependent dielectric breakdown reliability:

$$F_{ij}(t) = 1 - \exp\left[-\left(\frac{t}{\eta_{ij}}\right)^\beta\right] \tag{11}$$

$$= 1 - \exp\left[-\left(\frac{t}{(A \cdot \exp(-\gamma V^m / S_{ij}^m))(L_{ref}/L_{ij})^{1/\beta}}\right)^\beta\right]$$

$$= 1 - \exp\left[-\left(\frac{t}{(L_{ref}/L_{ij})^{1/\beta} \cdot \eta_{ref} \cdot \exp(-\gamma V^m (S_{ij}^{-m} - S_{ref}^{-m}))}\right)^\beta\right]$$

$$= 1 - \exp\left[-\left(\frac{t}{\eta_{ref} \zeta_{ij}}\right)^\beta\right]$$

where $$\zeta_{ij} = (L_{ref}/L_{ij})^{1/\beta} \cdot \exp(-\gamma V^m (S_{ij}^{-m} - S_{ref}^{-m})).$$

Figure 15B:
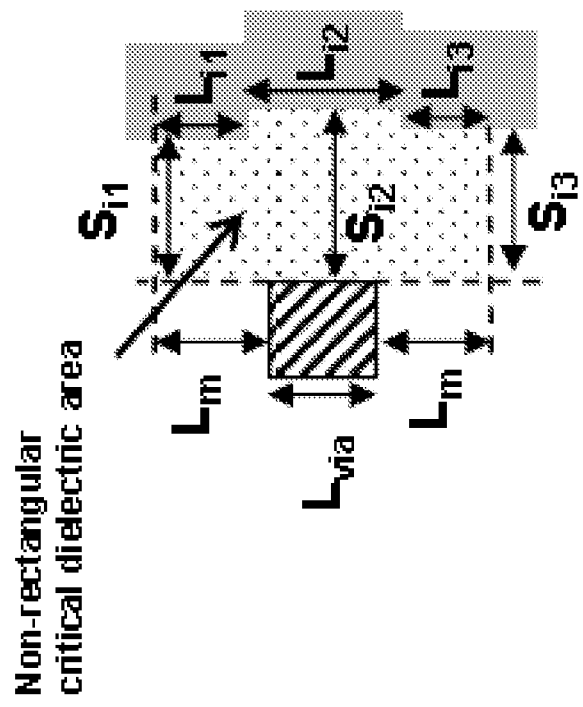
FIGS. 15A and 15B illustrate a wire and via marked with variables used in a preferred embodiment signal dependent method for analyzing the risk of dielectric breakdown in an interconnection pattern.
Figure 15A:
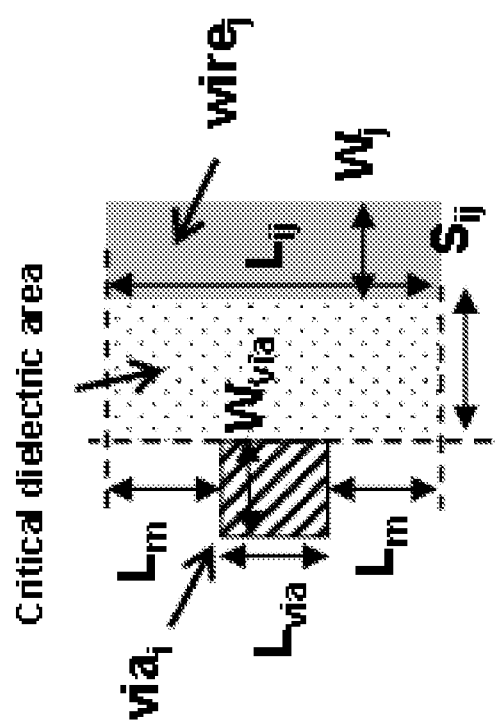

Here, $S_{ij}$ and $L_{ij}$ define the critical dielectric area in between via-wire pairs that is vulnerable to time-dependent dielectric breakdown reliability risk. $W_j$ denotes the width of the $j^{th}$ wire segment, $S_{ij}$ is the spacing between the $i^{th}$ via and the $j^{th}$ wires segment, and $L_{ij}$ is the length of the critical dielectric area in between the via-wire pair. $L_{via}$ and $W_{via}$ are the dimensions of a rectangular via in the preferred routing direction in the corresponding via layer, with the length being parallel to the preferred routing direction. For a simplified example, $L_{via}$ and $W_{via}$ are set to be equal, indicating a square via. A wire and via with the labels described here are shown in FIGS. 15A and 15B, where 15B represents an edge segment shift to increase TBBD. The above equation to define $F_{ij}(t)$ shows that the characteristic lifetime of a dielectric, $h_{ij}$, can be represented in term of test structure characteristic lifetime $\eta_{ref}$ with a scaling factor, $\zeta_{ij}$. To estimate chip-level failure probability, we can apply the weakest link model, which defines that a chip malfunctions whenever there is a single failure in any interconnect pair. Namely, $$F_{chip}(t) = 1 - \prod_{ij} \exp\left(-\left(\frac{t}{\eta_{ij}}\right)^\beta\right) \tag{12}$$

$$= 1 - \exp\left(-\left(\frac{t}{\eta_{ref}} \cdot \sum_{ij} \zeta_{ij}^{-1}\right)^\beta\right)$$

Where $F_{chip}$ is the chip-level failure probability.

The preferred analysis also considers the effect of signal patterns. The above definition for $F_{chip}$ assume constant stress, i.e. that interconnects around the dielectric portion in questions always have opposite signals. This is overly pessimistic, and the stress for the chip can be re-written as a function of time:

$$F_{chip}(t) = 1 - \exp\left(-\left(\frac{t}{\eta_{ref}} \cdot \sum_{ij} \alpha_{ij}\zeta_{ij}^{-1}\right)^{\beta}\right) \quad (13)$$

where $\alpha_{ij}$ is the ratio of total stressed time between the via i and the wire j to the lifetime of the interconnects. While this equation is more accurate, extracting the exact stress ratios for all via-wire pairs in a chip is difficult. Logic states of the interconnects (via and wires) are affected by input patterns of the chip, which may be inaccurate or unavailable during chip design time. Even if the input patterns are available, simulating the logic states and extracting the total stress time of all interconnects are time-consuming.

Instead of determining exact stress ratios, therefore, preferred embodiments instead provide an estimate of total stress time for interconnects with state probability (i.e., the probability that an interconnect has a logic state '1'). The state probability of all interconnects can be obtained from electronic design automation (EDA) tools through vectorless logic simulation, which is much faster than cycle-by-cycle simulation based on input vectors. Since the state probability only specifies the probability of logic state '1', but not the timing information of the logic state (i.e., when the logic state occurs, and time duration of the logic state), we assume that the interconnects have the worst-case signal distribution along the time axis, so that the resulting stress time and lifetime estimation is conservative. Given the state probabilities of two interconnects, the worst-case scenario (maximum stress time) is when one interconnect has logic state '1' at the beginning of a period of time and the other interconnect has logic state '0' at the beginning of the same period of time. In this case, the interconnect pair is being stressed at the beginning and at the end of the time period. Based on this observation, we can calculate the worst-case stress ratio $\alpha_{ij}$ for each interconnect pair.

The stress ratio is defined as the fraction of the time when a pair of interconnects have opposite logic signals.

$$\alpha_{ij} = \begin{cases} q_i + q_j, & \text{if } = (1-q_i) > q_j \\ (1-q_i) + (1-q_j), & \text{otherwise} \end{cases} \quad (14)$$

where $q_i$ is the probability of the $i^{th}$ interconnect to be logic '1'. In the worst-case stress time estimation, the logic states of interconnects i and j over time are "lumped" into a continuous logic "1" signal with a time duration respectively proportional to $q_i$ and $q_j$. By aligning the signals of interconnects i and j according to the worst case scenario mentioned above, we can estimate the stress ratio using the above equation. The stress estimated this way is always pessimistic compared to the actual stress ratio, but to a lesser degree than the static assumption of constant opposite voltage.

back-end-of-line via-to-wire spacing can vary due to mask misalignment, lithography-induced spacing variation, etc. To account for the impact of via-to-wire spacing variation on chip-level time-dependent dielectric breakdown reliability, we model the via-to-wire as a normal distribution with zero mean and a standard deviation $\sigma_s$. The expectation of $\zeta_{ij}$ under spacing variation ($\bar{\zeta}_{ij}$) is given by $$\bar{\zeta}_{ij} = \int_{x_{ij}=S_{ij}-3\sigma_S}^{x_{ij}+3\sigma_S} P(x_{ij}) \cdot (L_{ref}/L_{ij})^{1/\beta} \cdot \exp(-\gamma V^m(x_{ij}^{-m} - S_{ref}^{-m})) dx_{ij} \quad (15)$$

where $\bar{\zeta}_{ij}$ is the expectation of $\zeta_{ij}$, $x_{ij}$ is the value of via-to-wire spacing between via i and wire j and $P(x_{ij})$ is the probability of the spacing equal to $x_{ij}$. Since there is no analytical closed-form solution for $\bar{\zeta}ij$, we approximate it by discretizing the distribution of $x_{ij}$ into N equal intervals from $S_{ij}-3\sigma_s$ to $S_{ij}+3\sigma_s$.

$$\bar{\zeta}_{ij} \approx \sum_{n=1}^{N} cdf(x_{ij}(n)) \cdot (L_{ref}/L_{ij})^{1/\beta} \cdot \exp(-\gamma V^m(x_{ij}(n)^{-m} - S_{ref}^{-m})) \quad (16)$$

Here, $x_{ij}(n)$ is the $n^{th}$ interval of the discretized $x_{ij}$, and $cdf(x_{ij}(n))$ is the corresponding cumulative probability for the $n^{th}$ interval of the discretized $x_{ij}$.

Methods of the invention can increase reliability for back-end-of-line as technology scales. In the presence of large via-to-wire misalignment, back-end-of-line time-dependent dielectric breakdown limits wire density scaling. To reduce the design margin due to time-dependent dielectric breakdown, embodiments of the invention provide signal-aware chip-level time-dependent dielectric breakdown reliability estimation method. Unlike conventional time-dependent dielectric breakdown reliability estimation which assumes that the dielectric is always under DC stress, the preferred method estimates the stress ratio based on state probability of the routed signal nets in the chip. By using the signal-aware estimation, we have determined that chip-level time-dependent dielectric breakdown lifetime is approximately twice that obtained from the conventional analysis approach. The layout adjustment of the invention shifts wire edges to increase via-to-wire spacings to improve back-end-of-line time-dependent dielectric breakdown reliability. Experimental results using parameters reflective of the 32 nm foundry node show that the layout adjustment can increase chip-level lifetime by 9% to 10%; impact at 20 nm and below foundry node is expected to be more substantial. The improvement in chip lifetime also means that the chip can operate at a higher supply voltage with the same lifetime if time-dependent dielectric breakdown is the primary factor that limits the maximum allowed supply voltage. Layout adjustment methods of the invention can also benefit other aspects of the layout such as printability, electromigration, etc.

While specific embodiments of the present invention have been shown and described, it should be understood that other adjustments, substitutions and alternatives are apparent to one of ordinary skill in the art. Such adjustments, substitutions and alternatives can be made without departing from the spirit and scope of the invention, which should be determined from the appended claims.

Various features of the invention are set forth in the appended claims.

The invention claimed is:

1. A method for adjusting a layout used in making an integrated circuit, the method being implemented by a computer program stored on a non-transient medium in an optical proximity correction (OPC) tool, the method comprising executing the program that includes code for conducting steps of:
   receiving a netlist and a routed layout;
   analyzing the netlist to determine or estimate stress ratios created by signal patterns and extracting via to wire spacings from the routed layout;
   selecting one or more interconnects in the routed layout that are susceptible to dielectric breakdown from the stress ratios and via to wire spacings;

adjusting one or more selected interconnects to increase via to wire spacing with respect to at least one via and one wire of the one or more selected interconnects by one or more adjustments selected from the group consisting of shifting a wire edge segment, thinning a wire segment or rotating a via that has a rectangular shape;

providing layout adjustments including changes made by said adjusting;

wherein said providing comprises creating an annotated layout that defines one or more geometry adjustments to be performed on the one or more selected interconnects; and wherein the method further comprises using the annotated layout to manufacture an integrated circuit.

2. The method of claim 1, wherein the step of selecting selects the one or more interconnects based upon the stress ratios.

3. The method of claim 2, wherein the step of analyzing analyzes signal patterns of interconnects and estimates the stress ratios based on state probability of routed signal nets in the layout.

4. The method of claim 1, where at least one selected interconnect comprises a square or a rectangular via and a rectangular or polygonal wire.

5. The method of claim 1, wherein said adjusting comprises thinning a wire edge segment to increase wire-to-via spacing.

6. The method of claim 1, wherein said adjusting comprises rotating a via.

7. The method of claim 1, wherein said adjusting comprises shifting a wire edge segment to increase wire-to-via spacing.

8. The method of claim 7, wherein said shifting a wire edge segment comprises shifting an edge more than 50% of via width and less than 200% of minimum spacing of the layout pattern.

9. The method of claim 7, wherein said shifting a wire edge segment comprises shifting an edge more than 50% of via width and less than 300% of via width.

10. The method of claim 7, wherein said shifting a wire edge segment comprises shifting an edge more than 50% of via width and less than via width+200% of wire pitch of the layout.

11. The method of claim 7, wherein said shifting a wire edge segment comprises shifting an edge more than 35 nanometers and less than 175 nanometers for an adjacent via having a via width larger than 30 nanometers and less than 40 nanometers.

12. The method of claim 7, wherein said shifting a wire edge segment comprises shifting an edge more than 35 nanometers and less than 350 nanometers for an adjacent via with via width larger than 35 nanometers and less than 70 nanometers.

13. The method of claim 7, wherein said shifting a wire edge segment comprises shifting an edge more than 70 nanometers and less than 5 micrometers for an adjacent via having a via width larger than 70 nanometers and less than 1 micrometer.

14. The method of claim 7, wherein said shifting a wire edge segment comprises shifting an edge more than 0% of and less than 15% of the original wire width.

15. The method of claim 7, wherein said shifting a wire edge segment comprises shifting an edge more than 0% of and less than 15% of original via to wire spacing.

16. The method of claim 7, wherein said shifting a wire edge segment comprises shifting an edge more than 0 nanometer and less than 5 nanometers when via width is larger than 30 nanometers and less than 40 nanometers.

17. The method of claim 7, wherein said shifting a wire edge segment comprises shifting an edge more than 0 nanometer and less than 10 nanometers when via width is larger than 35 nanometers and less than 70 nanometers.

18. The method of claim 7, wherein said shifting a wire edge segment comprises shifting an edge more than 0 nanometer and less than 20 nanometers when via width is larger than 70 nanometers.

19. The method of claim 1, wherein said adjusting comprises creating a notch in a signal wire adjacent a via.

20. The method of claim 19, wherein the notch is 50% longer than the via.

21. The method of claim 1, wherein said adjusting permits edge segment shifting of a wire segment when no via is located above the wire segment being contemplated for shifting.

22. The method of claim 21, wherein said adjusting prevents edge segment shifting of a wire segment if a via is located in the layer immediately above or below the layer of the wire segment.

23. The method of claim 1, wherein said adjusting permits thinning of a wire segment by creating notches on both sides of a wire.

24. The method of claim 1, wherein said providing further comprises generating a cell library adjusted for time-dependent dielectric breakdown based on the layout adjustments.

25. The method of claim 1, wherein said adjusting comprises re-defining an overlapped segment of a wire in the vicinity of vias on both sides as new movable edge segments.

26. A method for making an IC using an annotated layout, comprising:

preparing an annotated layout that includes information describing distances by which one or more via or wire segment edges are to be changed to increase wire to via spacing based upon an analysis of signal patterns of interconnects;

producing an adjusted layout based upon the annotated layout which contains one or more layout adjustments consisting of the group selected from shifting a wire edge segment, thinning a wire segment or rotating a via that has a rectangular shape;

fabricating an IC using the adjusted layout produced by said step of producing.

27. The method of claim 26, wherein the information describes widths, lengths and distances of at least one via edge or at least one wire edge segment to be shifted.

28. The method of claim 27, wherein the information is formatted to allow the adjusted layout to pass design-rule checks of a design rule checker (DRC) tool even though the adjusted layout may violate a design rule if presented to the DRC.

29. The method of claim 26, wherein the information is readable by an electronic design automation (EDA) tool.

30. A method for making an IC using an annotated layout, comprising:

preparing an annotated layout that includes information describing distances by which one or more via or wire segment edges are to have an increased separation based upon an analysis of signal patterns of interconnects;

producing an optical proximity correction (OPC) solution that contains at least one layout adjustment, wherein the layout adjustment includes one or more adjustments selected from the group consisting of shifting a wire edge segment, thinning a wire segment or rotating a via that has a rectangular shape;

fabricating an IC using the OPC solution based on the annotated layout for lithography during fabrication of the IC.

31. A method for adjusting a layout used in making an integrated circuit, the method being implemented by a computer program stored on a non-transient medium in an optical proximity correction (OPC) tool, the method comprising executing the program that includes code for conducting steps of:

receiving a netlist and a routed layout;

analyzing the netlist to determine or estimate stress ratios created by signal patterns and extracting via to wire spacings from the routed layout;

selecting one or more interconnects in the routed layout that are susceptible to dielectric breakdown from the stress ratios and via to wire spacings;

adjusting one or more selected interconnects to increase via to wire spacing with respect to at least one via and one wire of the one or more selected interconnects by one or more adjustments selected from the group consisting of shifting a wire edge segment, thinning a wire segment or rotating a via that has a rectangular shape; and providing layout adjustments including changes made by said adjusting;

wherein the method further comprises producing at least one mask using the adjusted layout.

* * * * *